US005175503A

United States Patent [19]

Mishra et al.

[11] Patent Number: 5,175,503

[45] Date of Patent: Dec. 29, 1992

[54] ASCERTAINING IMAGING CYCLE LIFE OF A PHOTORECEPTOR

[75] Inventors: Satchidanand Mishra, Webster; Edward A. Domm, Hiltoon, both of N.Y.

[73] Assignee: Xerox Corporation, Stamford, Conn.

[21] Appl. No.: 636,034

[22] Filed: Dec. 28, 1990

[51] Int. Cl.[5] .......... G01N 27/60

[52] U.S. Cl. .......... 324/452; 324/457

[58] Field of Search .......... 324/452, 456, 457, 458, 324/659, 663, 678; 136/290

[56] References Cited

U.S. PATENT DOCUMENTS

| | | | |
|---|---|---|---|
| 3,121,006 | 2/1964 | Middleton et al. | 96/1 |
| 3,357,989 | 12/1967 | Byrne et al. | 260/314.5 |
| 3,442,781 | 5/1969 | Weinberger | 204/181 |
| 3,898,001 | 8/1975 | Gardenbrook et al. | 355/3 R |
| 4,134,137 | 1/1979 | Jacobs et al. | 358/293 |
| 4,233,384 | 11/1980 | Tyrner et al. | 430/59 |
| 4,265,990 | 5/1981 | Stolka et al. | 430/59 |
| 4,266,870 | 5/1981 | Eda et al. | 324/457 X |
| 4,286,033 | 8/1981 | Neyhart et al. | 430/58 |
| 4,291,110 | 9/1981 | Lee | 430/59 |
| 4,299,897 | 11/1981 | Stolka et al. | 430/59 |
| 4,306,008 | 12/1981 | Pai et al. | 430/59 |
| 4,319,544 | 3/1982 | Weber | 118/647 |
| 4,326,796 | 4/1982 | Champion et al. | 324/457 |
| 4,338,387 | 7/1982 | Hewitt | 430/58 |
| 4,415,639 | 11/1983 | Horgan | 430/57 |
| 4,439,507 | 3/1984 | Pan et al. | 430/59 |
| 4,512,652 | 4/1985 | Buck et al. | 355/14 CH |
| 4,654,284 | 3/1987 | Yu et al. | 430/59 |
| 4,894,607 | 1/1990 | Kumada | 324/457 X |

OTHER PUBLICATIONS

Z. D. Popovic, D. Parco and P. Iglesias, SPIE vol. 1253 Hard Copy and Printing Materials, Media and Processes, 175 (1990).

M. Stolka, J. F. Yanus and D. M. Pai, J. Phys. Chem., 1984, 88, 4707–4714, "Hole Transport in Solid Solutions of Diamine in Polycarbonate".

Zoran Popovic, Pablo Iglesias, "Characterization of Microscopic Electrical in Xeroxgraphic Photoreceptors", Fifth International Congress on Advances and Non-Impact Printing Technologies, Nov. 12–17, 1989, San Diego, Calif.

Zoran Popovic, Dave Parco, Pablo Iglesia, "Nature of Microscopic Electrical Defects in Organic Photoreceptors", Proceedings SPIE-SPSE Electronic Imaging Science and Technology Symposium, Feb. 11-16, 1990 Santa Clara, Calif.

R. Gerhard-Multhaupt and W. Petry, J. Phys. E; Sci. Instrum. 16, 421–422 (1983) E. J. Yarmchuck and G. E. Keefe, J. Appl. Phys. 66(11), Dec. 1, 1989.

*Primary Examiner*—Kenneth A. Wieder
*Assistant Examiner*—Glenn W. Brown

[57] ABSTRACT

A process for ascertaining the projected imaging cycle life of an electrophotographic imaging member including the steps of (a) providing at least one electrophotographic imaging member having a cycling life of a known number of imaging cycles, the imaging member comprising an electrically conductive layer and at least one photoconductive layer, (b) repeatedly subjecting the electrophotographic imaging member to cycles comprising electrostatic charging and light discharging steps, (c) measuring dark decay of the photoconductive layer during cycling until the amount of dark decay reaches a crest value, (d) establishing with the crest value a reference datum for dark decay crest value versus imaging cycles, (e) repeatedly subjecting a virgin electrophotographic imaging member to aforesaid cycles comprising electrostatic charging and light discharging steps until the amount of dark decay reaches a crest value which remains substantially constant during further cycling, and (f) comparing the dark decay crest value of the virgin electrophotographic imaging member with the reference datum to ascertain the projected cycling life of the virgin electrophotographic imaging member.

17 Claims, 9 Drawing Sheets

ASCERTAINING IMAGING CYCLE LIFE OF A PHOTORECEPTOR

BACKGROUND OF THE INVENTION

This invention relates in general to measuring dark decay in an electrophotographic imaging member and more specifically, to an apparatus and process for assessing the projected life of an electrophotographic imaging member.

In the art of electrophotography an electrophotographic plate comprising a photoconductive insulating layer on a conductive layer is imaged by first uniformly electrostatically charging the imaging surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated area. This electrostatic latent image may then be developed to form a visible image by depositing finely divided electroscopic toner particles on the surface of the photoconductive insulating layer. The resulting visible toner image can be transferred to a suitable receiving member such as paper. This imaging process may be repeated many times with reusable photoconductive insulating layers.

The flexible photoreceptor belts are usually multilayered and comprise a substrate, a conductive layer, an optional hole blocking layer, an optional adhesive layer, a charge generating layer, and a charge transport layer and, in some embodiments, an anti-curl backing layer.

Although excellent toner images may be obtained with multilayered belt photoreceptors, it has been found that as more advanced, higher speed electrophotographic copiers, duplicators and printers were developed, reduced life would occasionally be encountered during extended cycling. Surprisingly, cycling of belts made up of identical materials but differing in overall belt size and use in different copiers, duplicators and printers exhibited different life spans where one of the causes of failure was dark decay. Moreover, belts from different production runs had different life spans when cycled to the point of dark decay failure in any given copier, duplicator and printer. Since photoreceptor properties can vary from one production run to another and also during cycling, copy quality in many machines is maintained by feedback control system which constantly adjusts the machine operating parameters to compensate for the variations in the dark decay electrical characteristic of any given photoreceptor. Thus, photoreceptor life is partially governed by the design of the control system and this leads to different life spans in different machines for the same photoreceptor where failure is due to unacceptable dark decay. However, even the control system of any given machine cannot compensate for variations in photoreceptor dark decay characteristics that extend outside the operating range of the control system.

In the production of electrophotographic imaging members, particularly in web form, the complex nature of the manufacturing process renders unpredictable electrical characteristics of the coated web from batch to batch and from month to month. For example, reduction of photoreceptor life due to changes in environment affects the installation or adjustment of new coating applicators or the initial use of a newly prepared batch of coating material for one of the many layers of the photoreceptors such as the hole blocking layer, charge generating layer, or charge transport layer are difficult to identify within a reasonable length of time subsequent to the point in time that the photoreceptor comes off the production line.

During production of multilayered belt photoreceptors, a test run is conducted on prepared photoreceptor test samples each time a major change is made to the production line. Examples of such major changes include the installation or adjustment of new coating applicators or the initial use of a newly prepared batch of coating material for one of the many layers of the photoreceptors such as the hole blocking layer, charge generating layer, or charge transport layer.

One technique for determining how many cycles photoreceptors from a specific production run will perform satisfactorily in a specific type of given copier, duplicator and printer is to actually cycle the photoreceptor in the machine for the entire life of the photoreceptor. Generally, it has been found that actual machine testing provides the most accurate prediction of how a photoreceptor from a given batch will behave over its lifetime. However, machine testing for photoreceptor life requires weeks of testing involving hand feeding of sheets by test personnel along with constant monitoring of the final quality of every sheet. Since machine testing for the life of a photoreceptor belt requires hand feeding of copy sheets over many days for a single machine test of a single photoreceptor belt, the machine testing approach can be extremely expensive and time consuming. Moreover, accuracy of the test results depends a great deal upon interpretations and behavior of the personnel that are feeding and evaluating the sheets. Further, since machine characteristics vary from machine to machine for any given model or type, reliability of the final test results for any given machine model must factor in any peculiar quirks of that specific machine versus the characteristics of other machines of the same model or type. Because of machine complexity and variations from machine to machine, the data from a life test in a single machine is not sufficiently credible to justify the scrapping of an entire production batch of photoreceptor material. Thus, life tests are normally conducted in three or more machines. Life tests in copiers, duplicators or printers are extremely time consuming, labor intensive and very expensive. Since a given photoreceptor may be used in different kinds of machines such as copiers, duplicator and printers under markedly different operating conditions, the life prediction based on the machine life test of a representative test photoreceptor sample is specific to the actual machine in which photoreceptors from the tested batch will eventually be utilized will not necessarily predict what the life of that same type of photoreceptor would be in another different type of machine. Thus, for a machine life test, the test would have to be conducted on each different type of machine. This becomes extremely expensive and time consuming. Moreover, because of the length of time required for machine testing, the inventory of stockpiled photoreceptors waiting approval based on life testing of machines can reach unacceptably high levels. For example, a batch may consist of many rolls with each roll yielding thousands of belts. Still further delays are experienced subsequent to satisfactory life testing because the webs must thereafter be formed into belts, packaged and shipped.

Cycling scanners have also been utilized for life testing of photoreceptors. These scanners are designed to simulate the cycling of photoreceptors in a copier, duplicator and printer by subjecting a test sample of photoreceptor to timed charge, expose and discharge cycles. Scanners do not utilize all of the stations in a completely operational xerographic machine. Thus, for example, test scanners normally involve electrical charging, imagewise discharging and flood erase steps omitting the development, transfer and cleaning steps. Unfortunately, these scanners have proved to be of little value in regard to the issue of photoreceptor dark decay life in actual machines. For example, very little correlation has been found between scanner detected change in the charging potential at the time of development under traditional constant current cycling and actual machine testing. Also, scanners have proved to be very slow for production line monitoring.

Another technique for determining whether a photoreceptor have sufficient life to justify further processing is to fabricate the photoreceptors into belts and actually test how well they perform in customers' machines. Feedback in the form of reports from customers or performance evaluation reports from repair persons in the field are not always reliable because the tests are not conducted under controlled conditions and the cause of failure may be due to factors other than electrical such as the dark decay properties of the photoreceptor. Reliance on field tests can result in extensive delays, and, if the performance is unsatisfactory, will understandably aggravate customers. Moreover, reports from repair persons can be difficult to interpret because belt life may be affected by the peculiarities of the given machine involved, other factors affecting belt life that are unrelated to the electrical factors tested by the process of this invention, and the like. Also, data input from repair persons in the field requires one to accumulate and interpret the input over a period of time. This long delay can result in the introduction of large numbers of defective photoreceptor belts into the field.

To avoid fabricating an entire roll of photoreceptor material prior to testing, one can fabricate only a small part of the roll and test the resulting photoreceptor. If the test sample performs well during the test, the entire roll can thereafter be coated. However, testing by means of prior art techniques can still result in long delays because such testing required large amounts of time. Life testing in scanners can require several days, while 2 to 3 weeks are required for life test in machines and several months in the field are necessary for life tests in customers' machines. Thus, a production line could stand idle until the favorable test results were received. Since the expected life of a photoreceptor is extremely important from the viewpoint of manufacturing rate, inventory size, customer satisfaction and numerous other reasons, there is a great need for a system for rapidly determining the service life of flexible belt photoreceptors before initiating a full stage production run of flexible belt photoreceptors.

INFORMATION DISCLOSURE STATEMENT

Z. D. Popovic, D. Parco and P. Iglesias, SPIE Vol. 1253 Hard Copy and Printing Materials, Media and Processes, 175 (1990)—A scanning stylus instrument is described for use in the investigation of the electrical properties of individual microscopic defects in organic photoreceptors. A schematic diagram of the measurement circuitry is shown in FIG. 1 on page 176.

M. Stolka, J. F. Yanus and D. M. Pai, J. Phys. Chem., 1984, 88, 4707–4714, Hole Transport in Solid Solutions of a Diamine in Polycarbonate, is described. FIG. 1(*a*) is schematic of a layered structure shown comprising a semi-transparent gold layer, a molecular dispersion of a polycarbonate layer, and amorphous selenium layer, and an aluminum substrate. FIG. 1(*b*) the aluminum substrate layer appears to be connected to grounded voltage source and the semi-transparent gold layer appears to be connected to an oscilloscope and also ground to a resistor. Holes photogenerated in the selenium layer by a light flash are injected and displayed through a transport layer. The current due to the carrier transit is displayed on an oscilloscope on a double linear axis.

Zoran Popovic, Pablo Iglesias, "Characterization of Microscopic Electrical Non-Uniformities in Xerographic Photoreceptors", Fifth International Congress on Advances and Non-Impact Printing Technologies, Nov. 12–17, 1989, San Diego, Calif. An approach to study electrical nonuniformities in photoreceptors is disclosed in which a shielded stylus is used to scan a photoreceptor while in intimate contact with the photoreceptor surface. The photoreceptor is carried on a computer controller X-Y stage. The ground plane of the photoreceptor is connected to the high voltage power supply through a resistor and high voltage relay. A polish steel stylus tip is brought into contact with the photoreceptor surface. The stylus tip is immersed in silicon oil to prevent electrical breakdown. The presence of silicon oil insulation is absolutely necessary for reproducible measurements. The stylus shield is ground in a sensing electrode connected to an electrometer to measure the charge flow as voltage is applied to the sample. The whole system is controlled as Xerox 6065 personal computer.

Zoran Popovic, Dave Parco, Pablo Iglesias, "Nature of Microscopic Electrical Defects in Organic Photoreceptors", Proceedings SPIE-SPSE Electronic Imaging Science and Technology Symposium, Feb. 11–16, 1990, Santa Clara, Calif. The device described in the paper entitled "Characterization of Microscopic Electrical Non-Uniformities in Xerographic Photoreceptors", above, is used to investigate the electrical properties of individual microscopic electrical defects in organic xerographic photoreceptors. The shape of individual microscopic electrical defects were mapped and their current-voltage characteristics were measured.

R. Gerhard-Multhaupt and W. Perry, J. Phys. E; Sci. Instrum. 16, 421–422 (1983). A scanning capacitive probe is described for the measurement of surface-charge distributions on an electret foils. The probe is a MOSSET electrometer follower together with a high resolution adapter.

E. J. Yarmchuck and G. E. Keefe, J. Appl. Phys. 66 (11), Dec. 1, 1989. A technique is disclosed for direct, quantitative measurements of surface charge distributions on photoconductors. The photoconductors are carried on a stepping table from a corona charging station to an exposure station and then to the measurement station. Surface charge distribution is determined by a sequence of point-by-point charge measurements at different locations relative to the exposure. Charge measurements are made with an electrometer.

U.S. Pat. No. 3,898,001 to Hardenbrook et al, issued Aug. 5, 1975—An electrometer system is disclosed which measures electrostatic charges such as a charge level on a photoconductor surface. The electrometer measures a drop in surface voltage in an absence of light on a photoreceptor which is characterized as dark decay, e.g. see Column 1, lines 27-52. The electrometer can measure the remaining or background voltage on a photoreceptor remaining after exposure. The control of this background voltage is important for proper development and copy quality.

U.S. Pat. No. 4,134,137 to Jacobs et al, issued Jan. 9, 1979—A single wire microelectrometer imaging system is disclosed which includes a means to measure dark decay. A photoreceptor can be selected to minimize dark decay due to a scanning process requiring a finite length of time. A multiple probe electrometer array is provided which comprises a number of single probe electrometers which increase the electronics and gap maintenance complexity while reducing mechanics, image interlace complexities, and processing time.

U.S. Pat. No. 4,512,652 to Buck et al, issued Apr. 23, 1985—A controller is disclosed which regulates charging of a photoconductive member. The controller determines a charging current as a function of a rest time between successive copying cycles. The controller is adapted to adjust the charging current to compensate for dark decay.

U.S. Pat. No. 4,319,544 to Weber, issued Mar. 16, 1982, method and apparatus are disclosed which produce a dynamic bias value to control a toning process. The dynamic bias value appears as an electric potential on a bias electrode which is controlled to change with a natural change in a photoconductor charge with elapsing time. A natural decay curve may be synthesized digitally to produce a change in toning electrode bias.

Thus, there is a continuing need for a system for predicting photoreceptor life.

SUMMARY OF THE INVENTION

It is, therefore, an object of the present invention to provide an improved process for assessing the projected life of an electrophotographic imaging member which overcomes the above-noted deficiencies.

It is yet another object of the present invention to provide an improved process for more rapidly assessing the projected life of an electrophotographic imaging member.

It is still another object of the present invention to provide an improved process for more accurately assessing the projected life of an electrophotographic imaging member.

It is another object of the present invention to provide an improved process for more accurately assessing the projected life of an electrophotographic imaging member independent of machine interactions.

It is yet another object of the present invention to provide an improved process for determining the dark decay related failure mode of an electrophotographic imaging member.

It is yet another object of the present invention to provide an improved process for determining the dark decay related failure mode of an electrophotographic imaging member in a safer manner.

The foregoing objects and others are accomplished in accordance with this invention by providing a process for ascertaining the projected imaging cycle life of an electrophotographic imaging member comprising the steps of:

(a) providing at least one electrophotographic imaging member having a cycling life of a known number of imaging cycles, the imaging member comprising an electrically conductive layer and at least one photoconductive layer, (b) repeatedly subjecting the electrophotographic imaging member to cycles comprising electrostatic charging and light discharging steps, (c) measuring the dark decay of the photoconductive layer during cycling until the amount of dark decay reaches a crest value, (d) establishing with the crest value a reference datum for dark decay crest value versus imaging cycles, (e) repeatedly subjecting a virgin electrophotographic imaging member to a plurality of cycles comprising electrostatic charging and light discharging steps until the amount of dark decay reaches a crest value which remains substantially constant during further cycling, and (f) comparing the dark decay crest value of the virgin electrophotographic imaging member with the reference datum to ascertain the projected cycling life of the fresh electrophotographic imaging member.

BRIEF DESCRIPTION OF THE DRAWINGS

A more complete understanding of the present invention can be obtained by reference to the accompanying drawings wherein.

These figures merely schematically illustrate the invention and are not intended to indicate relative size and dimensions of the device or components thereof.

DETAILED DESCRIPTION OF THE DRAWINGS

Figure 1:
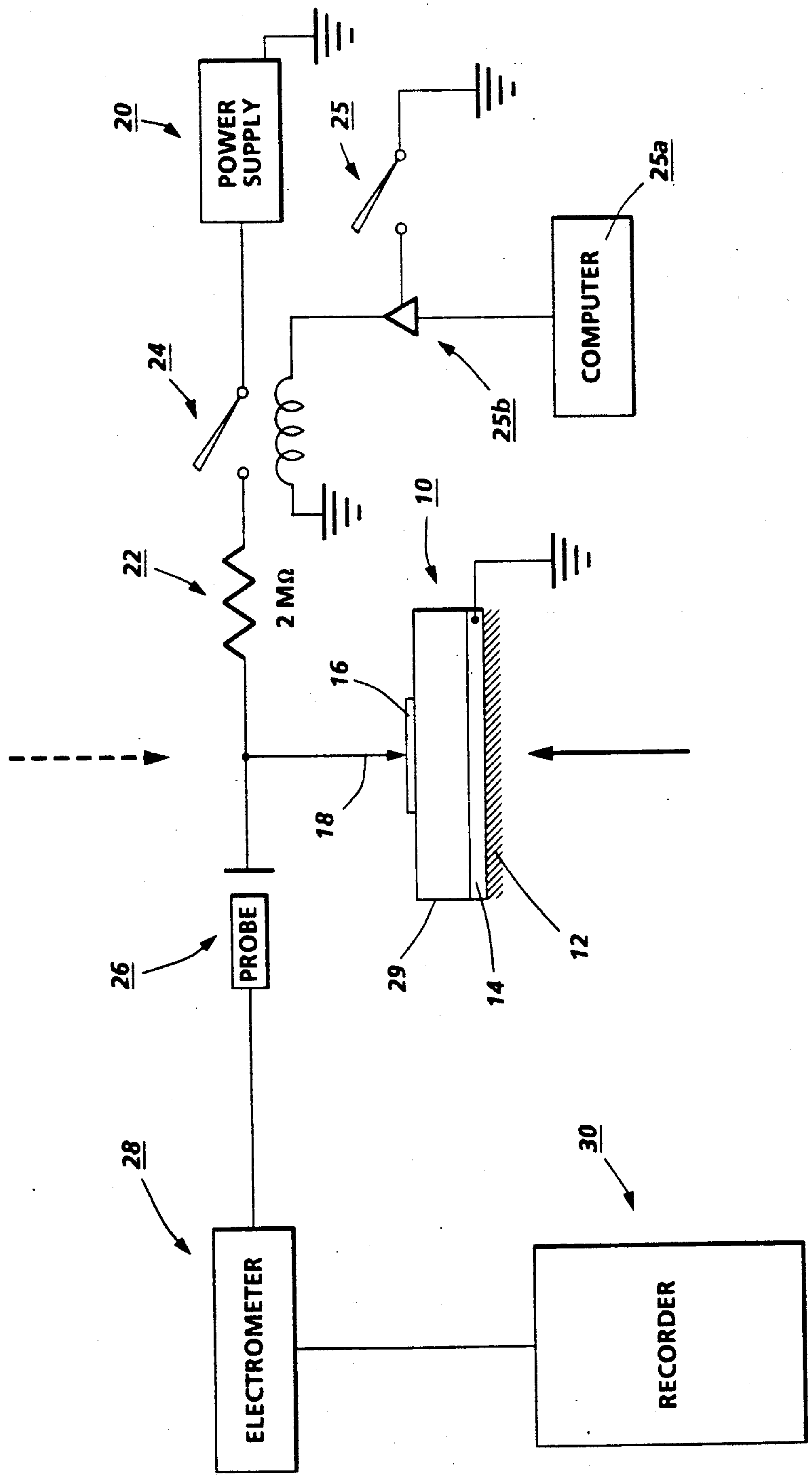
FIG. 1 is a schematic illustration of an electrical circuit employed in the system of this invention.

Referring to FIG. 1, a schematic, including an electrical circuit, employed in the system of this invention is shown in which a photoreceptor 10 rests on a substantially transparent support member 12. The electrically conductive surface of substrate layer 14 of photoreceptor 10 is electrically grounded. Photoreceptor 10 carries a thin, substantially transparent vacuum deposited metal electrode 16 on its upper surface. An electrical connector 18 connects electrode 16 with a high voltage power supply 20 through resistor 22 when a controller such as a relay 24 is closed. Relay 24 is activated by a signal from computer **25*a* which is fed through a FET 25*b*. The gate of the FET 25*b* is closed by the magnetically activated reed switch 25. The magnetic switch is closed when the lid of the apparatus is closed. A probe 26** (e.g. Model 17211, available from Trek) from a conventional electrometer 28 (e.g. Model 3666, available from Trek) senses, via electrical connector 18, the electrical field imposed across photoconductively active layer 29 during testing of photoreceptors. Photoconductively active layer 29 may comprise a single layer such as photoconductive particles dispersed in a binder or multiple layers such as a photoconductive charge generating layer and a charge transport layer. The output of electrometer 28 is fed to chart recorder 30 (e.g. Model TA2000, available from Gould) or to a suitable computer (not shown, e.g. IBM compatible computer). Exposure light (represented by dashed arrow) is periodically transmitted through substantially transparent electrode 16 to photoreceptor 10 and, similarly, erase light (represented by solid arrow) is periodically transmitted to photoreceptor 10 through transparent support member 12.

Figure 2:
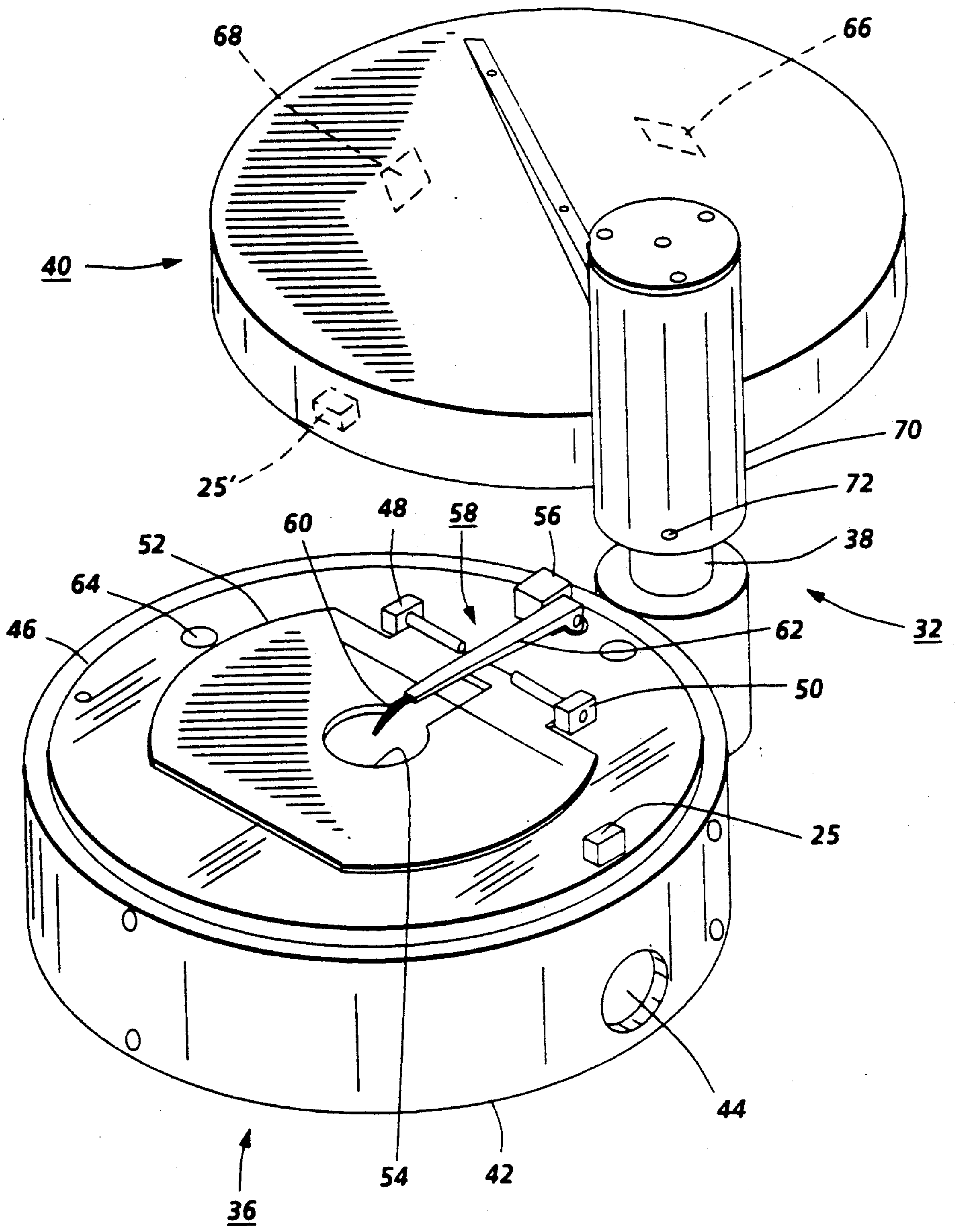
FIG. 2 is an isometric illustration of an apparatus employed in the system of this invention.

In FIG. 2, a dark decay detecting apparatus 32 is illustrated comprising a base assembly 36 which supports a vertical post 38 which in turn supports a cylindrical lid assembly 40. Base assembly 36 comprises a light tight cylindrical housing 42 having a opening 44 on one side to allow entry of power cords leading to an erase light source (not shown) located within housing 42 or to admit erase light from a suitable external source (not shown) and another opening on the other side (not shown) to allow entry of power cords leading to a light source (not shown) located within housing 42 or to admit exposure light from a suitable external source (not shown). Any suitable erase light source may be utilized. Typical erase light sources include broadband flash tubes such as xenon lamps. Although optional, it is preferred to tune the light source to the spectral response of the photoreceptor by suitably filters. As indicated above, the light from either the erase light exposure source or the exposure light source may be supplied by a source located within base assembly 36 or fed into base assembly 36 from an external source by any suitable means. Typical light feeding means include, for example, light pipes and the like. Secured to the flat glass upper platen 46 of cylindrical housing 42 are a pair of hinge post 48 which receive hinge pins 50 of pivotable flat ground plate 52. Flat glass upper platen 46 is transparent and electrically insulating. When a sample of photoreceptor 10 (see FIG. 1) is mounted for testing under ground plate 52, aperture 54 encircles but does not touch the circular vacuum deposited metal electrode 16 (see FIG. 1). Ground plate 52 is electrically grounded and contacts the upper surface of the photoreceptor sample to flatten the sample and to electrically ground the electrically conductive surface of substrate layer 14 of photoreceptor 10. Grounding of the conductive surface of layer 14 of photoreceptor 10 occurs because, mounting under ground plate 52, a strip of the photoconductively active layer 29 along one edge of photoreceptor 10 is scraped away to expose a portion of the electrically conductive surface of substrate layer 14. A thick conductive silver coating (not shown) is applied to the exposed strip of conductive surface. Since the upper surface of the deposited silver coating extends beyond the upper surface of photoconductively active layer 29, ground plate 52 contacts the silver coating when it rests on the upper surface of photoreceptor 10 thereby grounding the electrically conductive surface of substrate layer 14. Secured to the flat upper surface 46 of cylindrical housing 42 is hinge post 56 which supports pivotable electrical connector arm 58. Pivotable electrical connector arm 58 has an electrically conductive finger 60 which can be swung into and out of contact with the circular vacuum deposited metal electrode 16 (see FIG. 1) when a sample of photoreceptor 10 (see FIG. 1) is mounted for testing under ground plate 52. Ground plate 52 is connected to ground. When the free end of ground plate 52 is lifted to mount the sample, ground plate 52, connected to hinge pins 50, contacts and lifts the high voltage arm 62 and thus electrically grounds it. Thus, if other safety switches fail, the power supply will be short circuited and the relay in the power supply will switch it off. Lid assembly 40 swivels around and slides vertically on vertical post 38 and is adopted to fit as a light tight lid on top of base assembly 36. A hole 64 is positioned in flat glass upper platen 46 adjacent to the exposure light opening (not shown) on the side of base assembly 36 diametrically opposite from opening 44. Mounted on the roof of the hollow interior of lid assembly 40 are two exposure light mirrors 66 and 68. When cylindrical lid assembly 40 is aligned with and resting on base assembly 36, exposure light mirror 66 is positioned to horizontally reflect exposure light (projected upwardly from hole 64) to mirror 68 which in turn reflects the exposure light downwardly through the circular vacuum deposited metal electrode 16 (see FIG. 1) on photoreceptor samples. A magnetically activated reed switch 25 comprising mounted on the edge of flat glass upper platen 46 and permanent magnet 25' attached to the inside surface of lid assembly 40. Permanent magnet 25' is positioned to ensure that when lid assembly 40 is closed, magnet 25' rests over and activates reed switch 25 to close it. Closure of reed switch 25 causes, with the aid of suitable means such as a VFet transistor 25*b* shown in FIG. 1, high voltage relay 24 (see FIG. 1) to be ready to receive a trigger pulse from the computer 25*a*. When lid assembly 40 is opened, magnet 25' is moved away from reed switch 25, thereby opening reed switch 25 and turning off the VFet transistor 25*b* and high voltage relay 24, thus preventing accidental shock when an operator removes or inserts samples. Cylindrical lid assembly 40 is supported on vertical post 38 by a journal box 70. A guide pin 72 is press fitted into a hole in the side journal box 70. The pin projects beyond the inner surface of journal box 70 into a slot (not shown) machined into the periphery of vertical post 38. The slot is similar in shape to an inverted "L" so that when cylindrical lid assembly 40 is aligned directly over base assembly 36, pin 72 rides in the vertical portion of the inverted "L" shaped slot so that lid assembly 40 may be moved vertically toward and away from base assembly 36. When cylindrical lid assembly 40 is lifted upwardly from a "closed" or "test" position until pin 72 has shifted to the upper limit of the slot, lid assembly 40 can be swung horizontally with pin 72 riding in the horizontal portion of the inverted "L" shaped slot until lid assembly 40 reaches an "open", "load" or "unload" position relative to base assembly 36 similar to the position illustrated in FIG. 2.

In operation, with cylindrical lid assembly 40 in the "open" position, the free end of pivotable electrical connector arm 58 is pushed away from flat glass upper platen 46 by the plate 52 when it is lifted to mount the sample. In this position, the electric conducting finger 60 is grounded through plate 52. Because of the high voltages involved, the electrically conductive finger 60 and pivotable flat ground plate 52 should be electrically grounded during insertion and removal of a photoreceptor sample in the testing apparatus. Thus, when the pivotable flat ground plate 52 for flattening photoreceptor samples is raised to either insert or remove a photoreceptor sample, such raising automatically grounds the high voltage probe 60. This is a back-up safety feature because the arm 60 is also disconnected by safety switch 25 as the lid is lifted up. A sample of flexible photoreceptor is placed on flat glass upper platen 46. The sample is slightly smaller than the pivotable flat ground plate 52. The sample has previously been prepared (see above and hereinafter) for testing and carries a raised strip of thick conductive silver coating (not shown) along one edge of photoreceptor 10 to establish electrical contact with the conductive surface of substrate layer 14. Since the upper surface of the thick silver coating extends beyond the upper surface of photoconductively active layer 29, it contacts the lower surface of ground plate 52 to electrically ground the electrically conductive surface of substrate layer 14 of photoreceptor 10 when plate 52 is lowered to flatten photoreceptor 10. Photoreceptor 10 also carries a thin, substantially transparent (i.e. semitransparent) circular vacuum deposited metal electrode 16 of a suitable metal such as gold (see FIG. 1) on its upper surface that is encircled by, but not in physical contact with, aperture 54. The free end of pivotable electrical connector arm 58 is pivoted downwardly toward and into contact with metal electrode 16. Cylindrical lid assembly 40 is pivoted and lowered to produce a light tight fit between lid assembly 40 and base assembly 36. The assembly 40 closes the switch 25 and activates VFet transistor 25*b*. The computer pulse then can close the relay 24 for a desired, preselected time interval. A voltage pulse is applied by the activation of relay 24 for the preselected time interval, typically 100 milliseconds, and the dark decay of photoreceptor 10 is measured with probe 26 (see FIG. 1) and electrometer 28 (see FIG. 1) during the dark cycle following the voltage pulse but prior to light being emitted by the erase light. The voltage pulse may be at a fixed level, typically between levels to give a field of between about 45 volts/micrometer and about 80 volts/micrometer from one cycle to another or may be gradually increased to vary the field, typically from 10 volts/micrometer to 80 volts/micrometer, during the assessment period. A satisfactory voltage pulse range for both the fixed level or gradual increase embodiments is between about 5 volts/micrometer and about 100 volts/micrometer, but below dielectric breakdown. The dark decay measurement is taken at a fixed time period after termination of the voltage pulse, typically 1-2 seconds, and the measurement is recorded on chart recorder 30. If desired, any suitable computer (not shown) may be utilized instead of a chart recorder to monitor voltage during cycling. Photoreceptor 10 is then optionally exposed to the exposure light projected upwardly from hole 64 to mirror 66, then to mirror 68, and finally downwardly through the circular vacuum deposited metal electrode 16 (see FIG. 1) on the photoreceptor sample. To maximize light exposure through the electrode 16, the size of pivotable electrical connector arm 58 and electrically conductive finger 60 should be relatively small so that light exposure through electrode 16 is maximized. The entire sample is thereafter flood exposed by an erase light source (not shown) located within housing 42 or transmitted through opening 44 from a suitable source (not shown), through flat glass upper platen 46, through transparent support member 12, and through the electrically conductive surface of substrate layer 14. It is important that during the cycling, the erase light has sufficient intensity stability so that variable readings and other errors are avoided during measurements of photoreceptors from one batch to another. Since the erase light intensity should remain constant in order to give predictable readings, a suitable sensor (not shown) such as a photodiode may be utilized to detect changes in the light intensity so that the light may be either replaced or adjusted to ensure constant light intensity during the exposure and erase cycles. If desired, suitable filters (not shown) may be interposed between the erase light and photoreceptor to more accurately simulate the light frequency used in the copier, duplicator or printer in which the photoreceptor will ultimately be employed. Also, a conventional corotron or scorotron may be substituted for the electroded arrangement described above to apply an electrical charge to the photoreceptor sample. This is conveniently accomplished on a drum or flat plate scanner.

It was found with early experimental versions of the apparatus that reproducible results by different personnel conducting the tests on a variety of samples could not be achieved. The apparatus of this invention ensures that the photoreceptor is flat; ensures that the contact electrode is placed in the center of the metal electrode with minimum shadow effect; and ensures that the light utilized for erasure is at a constant intensity from sample to sample. These features enhance the accuracy of tests involving different test samples.

In the process of this invention, the typical photoreceptor tested comprises a flexible supporting substrate layer, an electrically conductive layer, an optional blocking layer, an optional adhesive layer, a charge transport layer and a charge generating layer. Rather than requiring large amounts of test material, the test sample may be quite small in size, e.g., 2 inches by 4 inches. It has been found that a test of one small sample is an effective test for an entire roll or batch of rolls prepared from the same coating batch. The photoreceptor is solvent treated along one edge to dissolve and remove parts of the charge transfer layer, charge generating layer and adhesive layer to expose part of the electrically conductive layer. A electrically conductive layer of silver paint is applied to the exposed surface of the electrically conductive layer for purpose of forming a terminal contact point for application of an electrical bias to the conductive layer.

A predetermined area of the imaging surface of the photoreceptor not treated with solvent is coated with a thin vacuum deposited gold or other suitable metal layer through a mask or stencil having an appropriate size and shaped opening to form another electrode so that an electrical bias can be applied across the photoconductive layers of the photoreceptor from the gold electrode to the electrically conductive layer. The thickness of the metal electrode from one photoreceptor sample to another should be the same to ensure that the amount of light transmission is also the same as that used for the obtaining of the comparison data to establish a standard. The metal electrode may be of any suitable size and shape, but the size and shape should be the same from one photoreceptor sample to another to ensure accurate comparisons.

As described above, the process of this invention is especially useful for assessing virgin samples of photoreceptors from the output of a manufacturing line to determine the expected life of the photoreceptor to the point of failure due to unacceptable dark decay. The expression dark decay is defined as the decrease in potential on the electrode measured after a fixed time interval after the charging pulse has been switched off. The time interval chosen is, in general, the time to the development station after charging or the time to the erase station. Since the formation of the electrostatic latent image takes place before the development step in xerography, the time from charging termination to the moment of image exposure is shorter than from charging termination to the moment of development or from charging termination to the moment of erase. In order to more closely simulate machine conditions and also to ascertain the $V_{ddp}$ and dark decay to the moment of development the sequence of cycling involves switching on and off of the exposure light on alternate cycles (see FIG. 3) but switching on and off of the erase in every cycle. However, the use of an exposure light may be omitted, if desired.

Figure 3:
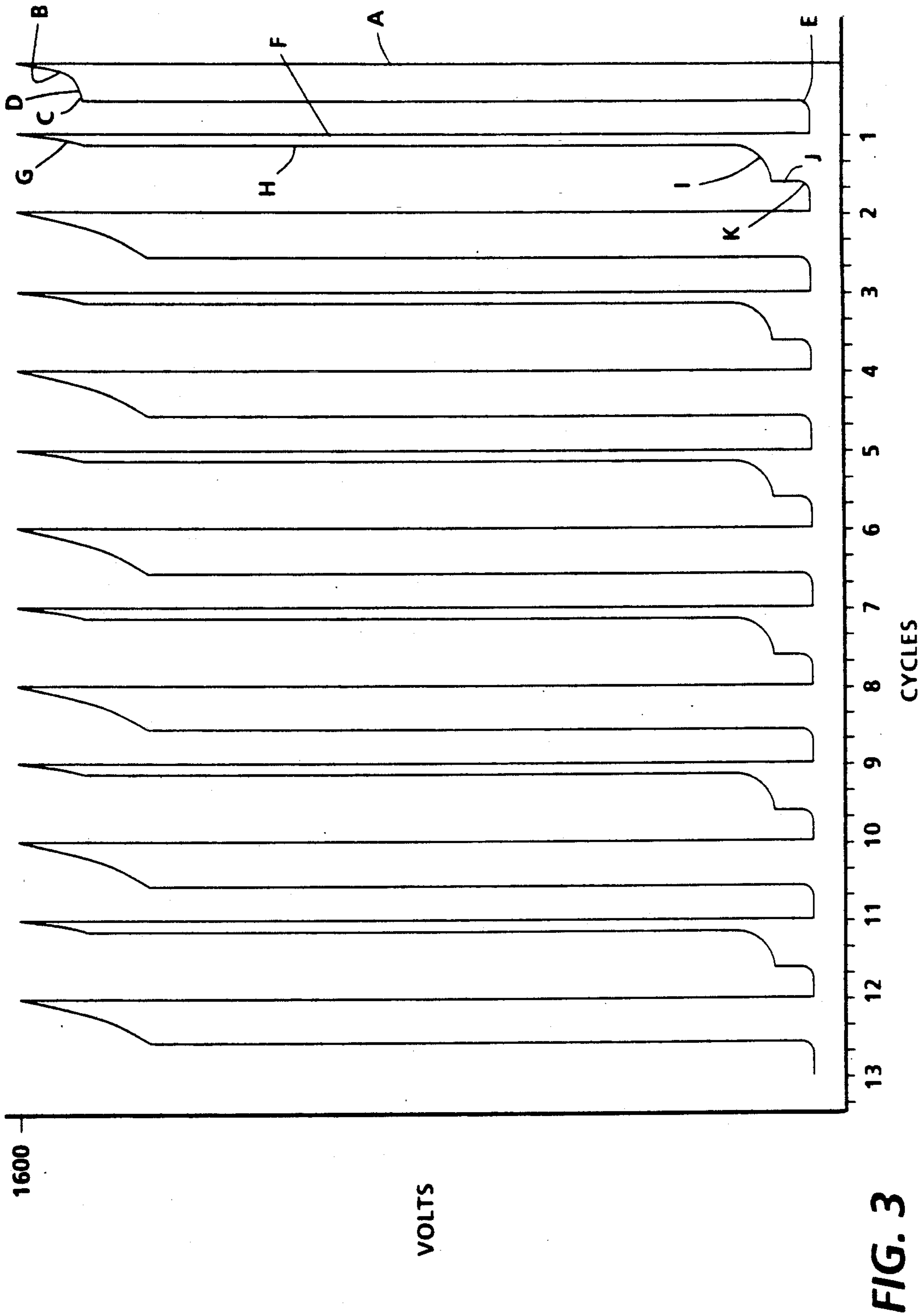
FIG. 3 is a chart illustrating cycles involving charging, dark decay and discharging effects.

The electric charging pulse applied to the sample during testing may be at a fixed predetermined potential or the potential may be increased in small predetermined cyclic sequences. In the embodiment of this invention where the charging voltage across the sample is kept constant, the dark decay generally increases with cycling at a fixed voltage but levels off at a crest value after a few cycles. Typically, it takes about 10 to about 20 cycles for stable dark decay to be achieved, i.e. attainment of a crest value, but may vary somewhat depending on the specific sample tested. The dark decay is continuously monitored on a recorder or suitable computer. This stable dark decay or crest value is measured as illustrated in FIG. 3 wherein initial charging to 1600 volts is shown by the vertical line (A) on the right hand side of the figure. Dark decay begins as soon as the initial charging is completed and is represented by curve (B). The potential of the charged areas of the electrostatic latent image that would be formed during the image exposure step of a normal imaging cycle is close, but prior to the beginning of the erase exposure step at point (C). Thus, the potential of the charged areas of the electrostatic latent image would be located at about point (D) on the dark decay curve (B). Although dark decay to point (D), or any other point measured at some fixed time after termination of charging, may be utilized for determining the crest values for electrophotographic imaging members, it is usually more convenient and more accurate to measure dark decay to point (C) where the erase exposure step begins. Upon termination of the erase step, the residual charge on the photoreceptor dark decays further as illustrated by curve (E). Vertical line (F) represents the charging step for the second cycle. Thus, the first cycle is represented by curves and points (A) through (E) to (F). Dark decay from termination of charging to the point of image (background) exposure is represented by curve (G). Discharge during the image (background) exposure is represented by curve (H). Upon termination of the image (background) exposure step, the residual charge on the photoreceptor dark decays further as illustrated by curve (I) until the erase exposure step shown by (J). Upon termination of the erase step, the residual charge on the photoreceptor dark decays further as illustrated by curve (K). Thus, the second cycle is represented by curves and points (F) through (K) to the next charging step. This image (background) exposure cycle can be omitted from the test cycling procedure but the crest value of dark decay would be higher. Although the image (background) exposure cycle is used above during every other cycle, one can use the exposure cycle for every cycle and omit the image (background) cycles.

The amount of dark decay between termination of charging and image (background) or erase exposure reaches a crest value during repeated cycling. Satisfactory projections of imaging life may be obtained when this crest value is selected when the change in dark decay from cycle to cycle at corresponding points (whether from charge-erase cycle to charge-erase cycle or from charge-image (background) exposure-erase cycle to charge-image (background) exposure-erase cycle) is less than about 20 volts. Preferably, the crest value is selected when the change in dark decay from cycle to cycle is less than about 10 volts. Optimum accuracy is achieved when the crest value is selected when the change in dark decay from cycle to cycle is less than about 5 volts. These cycling readings are obtained for electrophotographic imaging members having an acceptable cycling life of a known number of imaging cycles. Readings from at least two photoreceptors having a known number of imaging cycles, one having a better cycling life than the other, may be used to obtain a curve for purposes of comparison with photoreceptors having an unknown cycling life. This technique is used to project the life when neither photoreceptors having a known number of imaging cycles have a cycling life at the threshold acceptance criterion. Alternatively, acceptable and unacceptable photoreceptors may be identified by comparison to a known standard that has a threshold cycling life.

Figure 4:
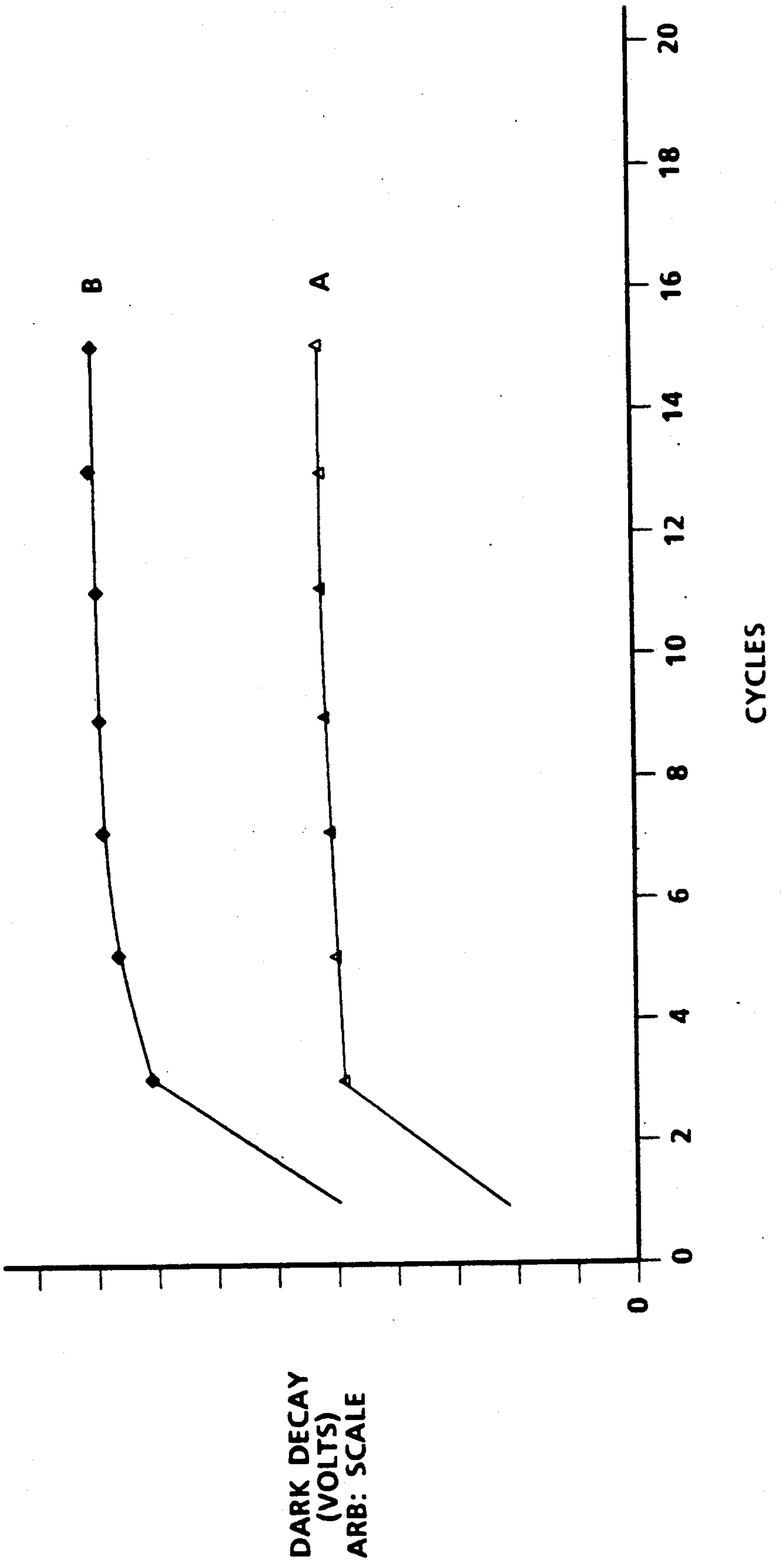
FIG. 4 is a chart illustrating a relationship between dark decay with cycles.

In FIG. 4, the dark decay versus cycles of two photoreceptors, A and B, are plotted. The leveling off of dark decay at a crest value after a few cycles is readily apparent for each of these photoreceptors.

Figure 5:
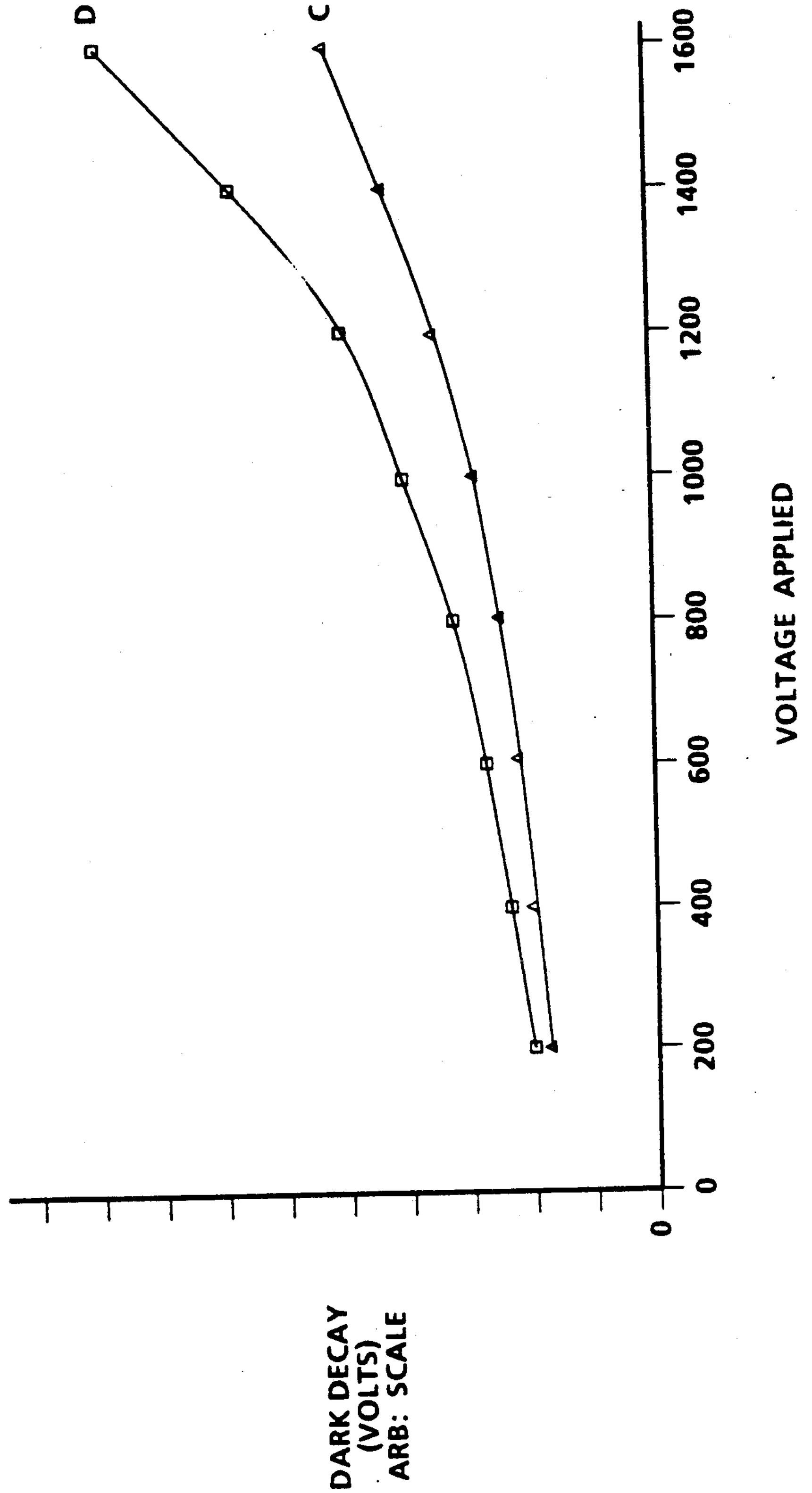
FIG. 5 is a chart illustrating a relationship between crest dark decay with applied voltage.

Generally, when a fixed predetermined charging voltage level is utilized, satisfactory results may be achieved with an applied voltage pulse which gives a field between about 45 volts/micrometer to 80 volts/micrometer. When the level of charge is too high, undesirable electrical arcing can occur. Charging at low voltage levels, e.g. sufficient to produce a field of 10 volts/micrometer, results in smaller dark decay voltage drops between acceptable samples and unacceptable samples so that it becomes more difficult to detect unacceptable samples. This characteristic of smaller dark decay voltage drops at low voltage levels is illustrated in FIG. 5, where dark decay is plotted against applied voltage for photoreceptors C and D. One can compare the entire curve but since the curves fan out at higher voltages, better discrimination between acceptable photoreceptors and unacceptable photoreceptors is obtained at higher voltage levels. The use of a value other than the actual crest value but close to it, e.g. after every 4th cycle, might produce similar information. Thus, every 4th or 5th pulse may be sufficient. In the data illustrated in FIG. 5, 4 cycles were used at each step. However, by the time higher voltages levels are reached, one does not need many cycles to attain a crest value. This is not the case if one applies high voltage levels from the very first cycle as was done in Examples I and II. In the latter embodiment, it takes more cycles, e.g. 10, to come to reach a crest value.

Figure 6:
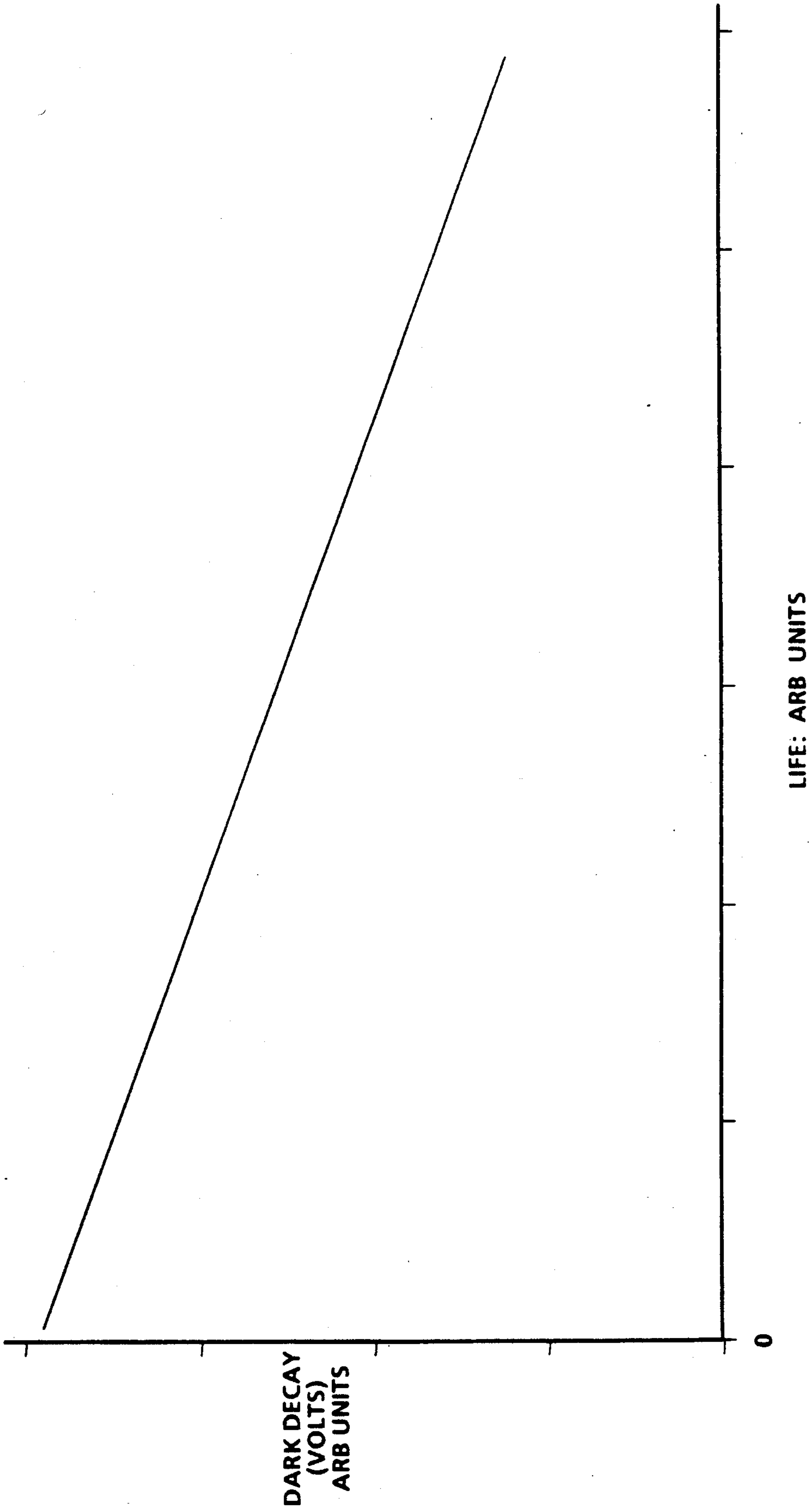
FIG. 6 is a chart illustrating a relationship between crest dark decay and cycling life.

In FIG. 6, the crest values of several different photoreceptors having different but known cycling lives (given in arbitrary dark decay units) are plotted against the corresponding known life (given in arbitrary units). These points pass through a straight line which serves as a calibration curve for projecting the life. Preferably, the crest values of more than two photoreceptors having different but known cycling lives is used to prepare the calibration curve to ensure that "noise" from any aberrations is averaged out. By using the y-axis and merely determining where the crest value of a photoreceptor having an unknown life falls along the reference datum calibration curve, one may rapidly identify on the x-axis the expected or projected life of a freshly prepared photorecptor having an unknown life. This avoids all of the time, equipment, manpower and uncertainty required by prior techniques to ascertain the life of a photoreceptor. In unacceptable photoreceptors, the dark decay can reach such a high level during machine cycling that for a given machine, the power supply may not be able to produce a charging voltage sufficiently high enough to maintain development voltage relatively constant from one imaging cycle to the next imaging cycle. If development voltage changes from one imaging cycle to the next imaging cycle, the quality of the developed image changes in that the copies may appear faint.

In another embodiment of this invention, the potential across a sample is varied to give a field from a low value to a high value (e.g. to give a field within a range of about 6 volts/micrometer to about 80 volts/micrometer) in successive cycling sequences of only about 4–6 cycles conducted at each setting of voltage. The number of successive cycling sequences conducted at each setting of voltage does not appear to be critical. A typical value of dark decay at higher applied voltages is about 200 volts/sec. However, this value of dark decay is sample dependent. Higher voltages are used because the discrimination between samples at lower voltages is less clear. The time period for application of the voltage pulse can, for example, be between 10 milliseconds and about 1 second. A typical value of 100 millisecond corresponds to the time under a charging corotron in a copier, duplicator or printer. For accurate comparisons against a standard, the applied pulse potential and duration of the pulse and test sequence should be identical to that used to determine the standard. Similarly, the photoreceptor should be as flat as possible during measuring measurement to ensure consistent readings that can be effectively compared to the standard.

The number of cycles to be run in either the fixed high electrical bias test or the increasing electrical bias test depends upon the type and quality of photoreceptor tested. In any event, for best results, the number of cycles run should be to about the point where stable dark decay, i.e. a crest dark decay value is attained. Generally, the number of cycles often ranges from about 4 to about 40 cycles. The potential of a photoreceptor decreases even in dark. The potential attained at the development station without the photoreceptor being exposed to light is referred to as $V_{ddp}$. Typical values of $V_{ddp}$ may be between about 600 and about 1000 volts in a given machine. $V_{ddp}$ registers two types of changes with cycling. In the first change, after initial exposure, the dark decay undergoes changes in a few cycles and thereafter becomes stable at a crest value (see FIGS. 3 and 4). The second is a long term effect which manifests itself as a gradual decrease in $V_{ddp}$ (increase in dark decay) over many tens of kilocycles. It is the initial stable value (crest value) of dark decay which, at the appropriate electrical field, is important in predicting the life of a photoreceptor in a machine, notwithstanding the fact that the cause for the failure could be for diverse reasons such as poor charge generating layer coating compositions, charge blocking layer coating compositions, charge transport layer coating compositions, process of fabrication and the like.

Generally, test data is obtained from one or more unused samples from a good batch from which photoreceptors have been successfully tested in actual machine use. This test data is utilized as a control or standard. The stable dark decay or crest value at the highest field has been found to be a measure of photoreceptor life in different machines. Generally, this test data involves the identification of an acceptable stable dark decay or crest value as a cut off level standard for a specific machine type and a specific photoreceptor. By performing assessment tests on both long life acceptable photoreceptors and short lived unacceptable photoreceptors for a given type of electrophotographic copier, duplicator or printer, one can establish a reference datum for comparison against newly fabricated photoreceptors to rapidly determine whether the new photoreceptor will have an acceptable or unacceptable machine life without time consuming scanner, machine or field testing. As illustrated in FIG. 6, a reference datum has been established from dark decay data from a plurality of photoreceptors having different longevities. Dark decay data from a virgin (unused or freshly prepared) photoreceptor can readily be compared to the reference datum to determine whether the photoreceptor will have an acceptable or unacceptable lifespan. Although graphs are described above to illustrate how a reference datum for dark decay versus imaging cycles can be used to predict the life of a freshly prepared or unused photoreceptor, online computerized procedures with look-up tables may be utilized instead where a standard for rejecting the belt has been prerecorded.

Figure 7:
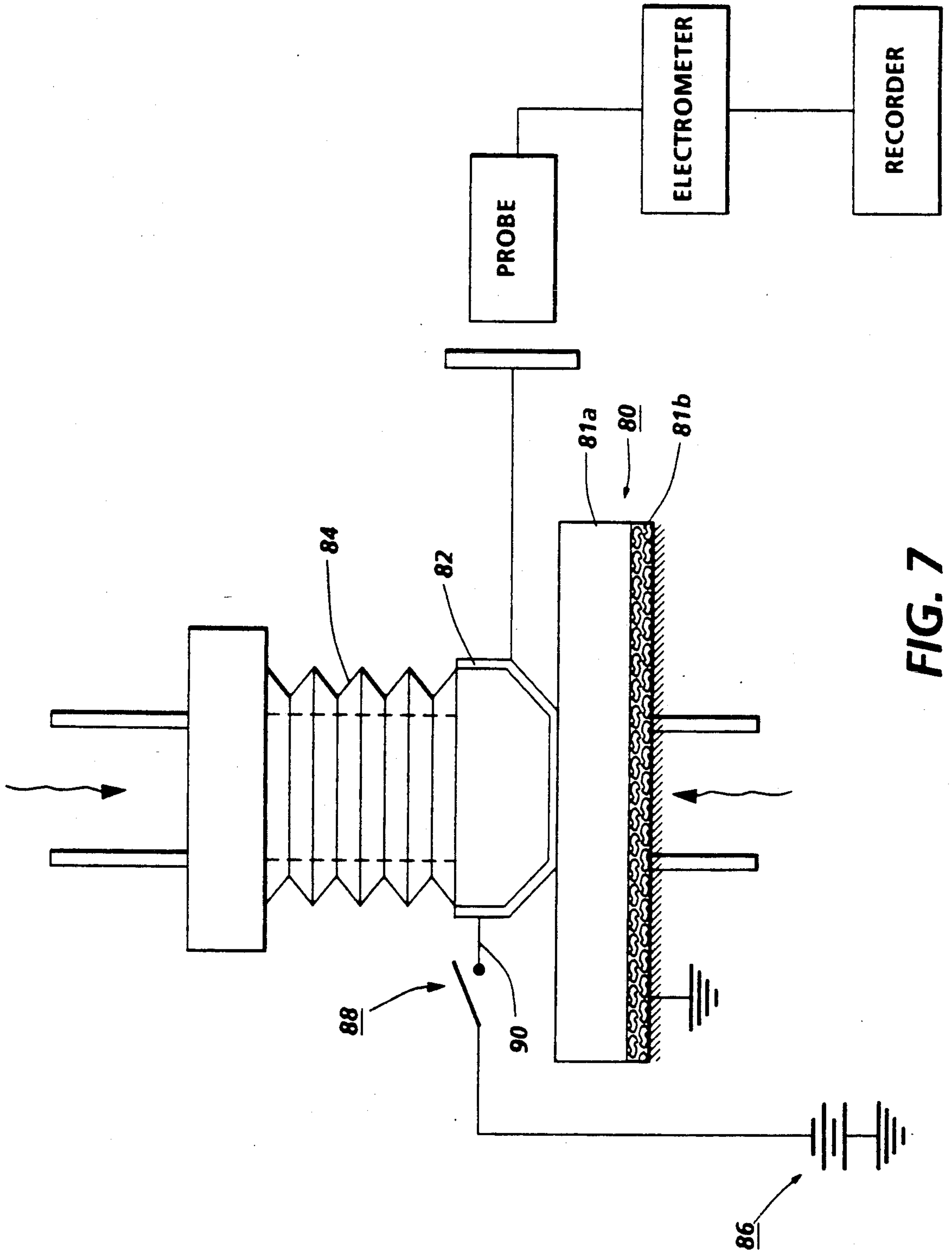
FIG. 7 is a schematic illustration of another embodiment of an electrical circuit employed in the system of this invention.

An alternative to the electroded technique for charging photoreceptor described above is through pressure contact. The schematic arrangement of the apparatus is shown in FIG. 7. Electrical contact is made on the top of a photoreceptor sample 80, comprising a charge transporting layer 81*a* and a charge generating layer 81*b*, through a transparent Nesa glass cone 82 which is supported by resilient metallic bellows 84. The electrically conductive outer surface of Nesa glass cone 82 is pressed against the upper surface of photoreceptor sample 80 to ensure good electrical contact. The transparent Nesa glass cone 82 is electrically connected to a power supply 86 through a relay 88 and a wire 90 soldered to the electrically conductive outer surface of Nesa glass cone 82. The arrangement for the rest of the apparatus is essentially identical to that shown in FIG. 1.

Yet another way to charge a photoreceptor sample to high electric fields is by the use of charging devices such as corotron or a scorotron. The dark decay is measured at a later stage in time. This could best be accomplished in a fast drum scanner or a flat plate scanner where the photoreceptor sample is passed under the device in a time interval of the order of 10's of milliseconds.

Figure 8:
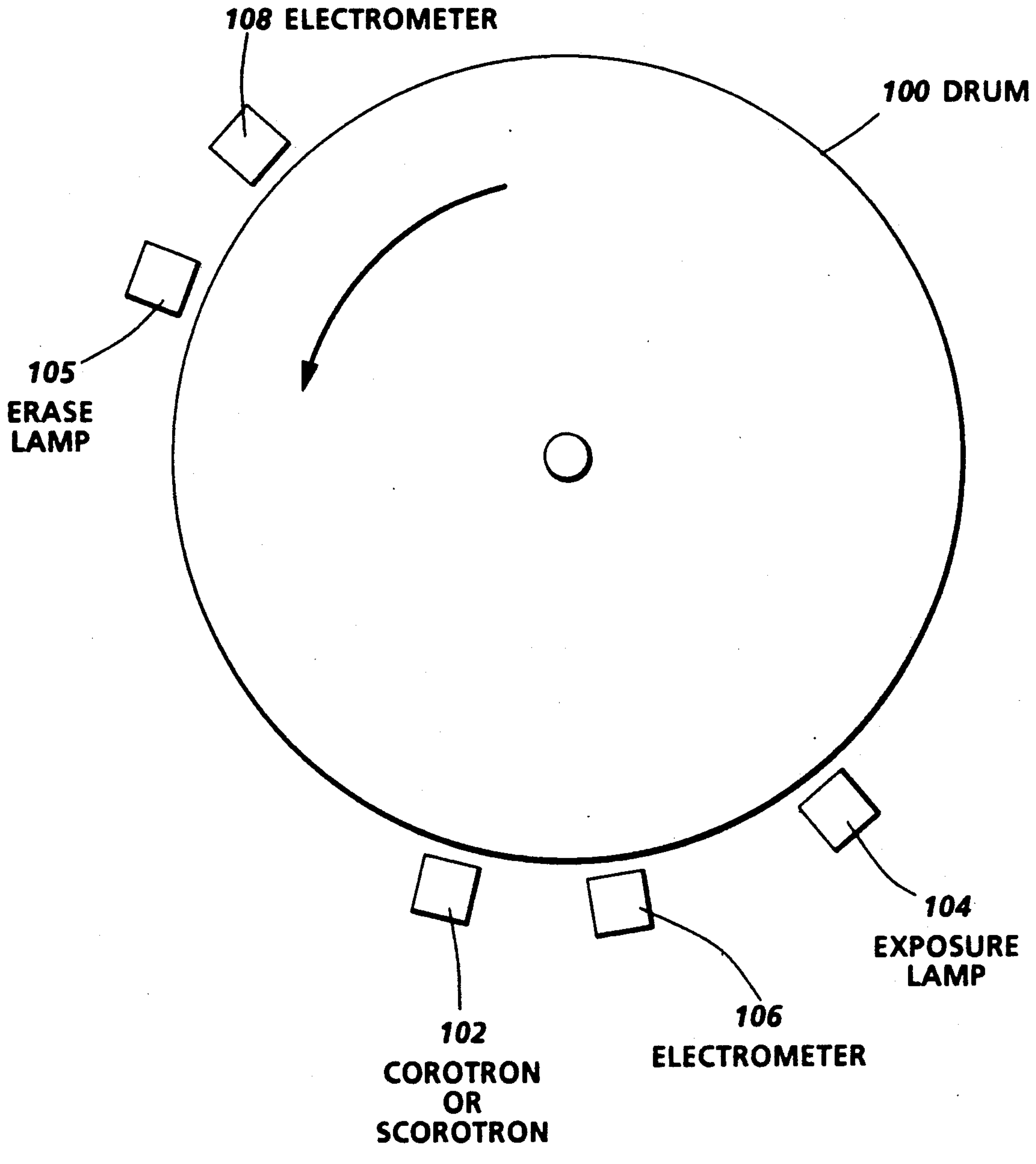
FIG. 8 is a schematic illustration of another embodiment of an apparatus employed in the system of this invention.

In FIG. 8, another embodiment of this invention is shown. A rotatable drum 100 is driven by a suitable means (not shown) in the direction indicated by the arrow. Mounted adjacent to and spaced from the outer periphery of drum 100 are a corotron or scorotron 102, exposure lamp 104, erase lamp 105, electrometer 106 and electrometer 108.

In operation, a flexible photoreceptor sample (not shown) to be tested is mounted on the drum by any suitable means such as adhesive tape for rotation with the drum. The drum is thereafter rotated and charged by corotron or scorotron 102. The electrometers 106 and 108 measure the voltages across the thickness of the photoreceptor sample at different times. The photoreceptor sample is cycled through several (typically 10) charge, erase and/or exposure cycles. During cycling, dark decay is stabilized and a dark decay crest value is attained. These cycling runs may be operated in either of two modes. In the first mode, the exposure lamp 104 is shut off altogether and the dark decay is measured after it stabilizes to obtain the dark decay crest value. In the second mode, the photoreceptor is cycled first with exposure lamp 104 and erase lamp 105 activated followed by a cycle with exposure lamp 104 shut off during the dark decay measurement cycle. Dark decay defined in this embodiment is the difference of voltage detected by probes 106 and 108. Once a reference datum for dark decay versus imaging cycles is established based on at least one electrophotographic imaging member having a cycling life of a known number of imaging cycles, the dark decay crest value obtained from samples having a cycling life of an unknown number of imaging cycles is utilized for projecting the cycling life of the samples. The circumference of drum 100, the speed of the drum rotation, and the relative locations of corotron or scorotron 102, exposure lamp 104, erase lamp 105, electrometer 106 and electrometer 108 are preferably adjusted to closely simulate the time sequences in the type of belt copier, printer or duplicator in which the photoreceptors from the tested fabrication batch will actually be utilized.

In yet another embodiment of this invention, the sample can be passed under the charging device in a flat plate scanner at high speed (typically between about 10 inch per sec and about 75 inch per second) and is thereafter brought to rest under an electrometer as described above and below where dark decay is measured with time.

In still another embodiment of this invention a sequence of charging devices such as corotron/scorotron and erase lamps can be installed on manufacturing line. After undergoing a sequence of charge erases as described above, the dark decay can be measured by two electrometers installed spaced apart downstream of the web. The high voltage dark decay obtained can be used for online projection of the life.

Thus, the future failure of a photoreceptor can be projected by the process of this invention notwithstanding the fact that the failure may be due to various different causes. For example, the failure of photoreceptor life due to the eventual formation of very faint images can rather readily be detected. More specifically, if charge current is plotted against copy cycling in a machine, it has been found that the charging must be increased gradually with cycling to compensate for faint images until a point is reach where the rate of increase becomes so rapid that the machine power supply fails to provide enough current to maintain the $V_{ddp}$ at a fixed or constant value and the machine must be shut down. With the process of this invention, a cut off level may be established for an acceptable life of a photoreceptor so that when a sample is tested, one may rapidly determine whether premature photoreceptor failure will occur and the manufacture of large quantities of unsatisfactory photoreceptor material can be avoided. The premature rapid change in the rate of charging current demands, can be caused by numerous factors.

For accurate comparisons against a standard, the light exposure and the erase intensities must remain constant. This can be achieved by monitoring the light intensity with a photodiode mounted in the test device housing. The stray light from the sample during the exposure and erase pulses can be measured for light intensity provided the geometrical arrangement is not changed during cycling. This can be achieved by fastening the photodiode to the lid at a suitable location (not shown in the figures). If the light intensity of the light source, for example, a strobotac (available from Gen Rad Inc, Mass. USA) is found to have changed it can be tuned back to the original intensity by inserting appropriate neutral density filters between the light source and the photoreceptor sample. The actinic exposure intensity to be employed depends on the thickness of the transparent metal electrode. Thus, the thickness of the transparent metal electrode is monitored while the metal, e.g. gold, is evaporated onto the photoreceptor surface to form the contact electrode. Further, the light intensity can be indirectly monitored through the electrical characteristics of photoreceptor samples such as the background potential of two or more control samples that were previously tested and archived. The light intensity to be used for both exposure and erase depends on the speed and frequency sensitivities of the photoreceptor sample being tested. Typical light intensities are between about 3 $ergs/cm^2$ and about 20 $ergs/cm^2$ for the exposure step and between about 100 $ergs/cm^2$ and about 1500 $ergs/cm^2$ for the erase step. A typical light frequency range is between about 400 nm to 10000 nm for the spectral sensitivity range of the photoreceptors to be tested. The test system of this invention can also be utilized to predict how a photoreceptor will behave if various conditions during manufacturing are deliberately changed. Thus, for example, it can be utilized to predict the kind of performance a photoreceptor is likely to provide if the formulations of any of the photoreceptor layers is changed or the thickness of any of the layers are varied or if some of the fabrication conditions such as humidity, coating technique and the like are deliberately altered. Generally, armed with the fact that the tested sample exhibits unsatisfactory photoreceptor performance, one may thereafter review manufacturing records to determine whether any unusual events occurred which might affect the ultimate performance of the photoreceptor. For example, a difference in the manner in which one of the photoconductor layer coating composition was prepared or applied may be responsible for the unsatisfactory photoreceptor performance and this problem can promptly be rectified.

Electrostatographic flexible belt imaging members (photoreceptors) are well known in the art. The electrostatographic flexible belt imaging member may be prepared by various suitable techniques. Typically, a transparent flexible substrate is provided having a thin, transparent, electrically conductive surface. At least one photoconductive layer is then applied to the electrically conductive surface. An optional thin charge blocking layer may be applied to the electrically conductive layer prior to the application of the photoconductive layer. If desired, an optional adhesive layer may be utilized between the charge blocking layer and the photoconductive layer. For multilayered photoreceptors, a charge generation layer is usually applied onto the blocking layer and charge transport layer is formed on the charge generation layer.

The substrate is substantially transparent and may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like which are flexible as thin webs. The electrically insulating or conductive substrate should be flexible and in the form of a flexible web. Preferably, the flexible web substrate comprises a commercially available biaxially oriented polyester known as Mylar, available from E.I. du Pont de Nemours & Co. or Melinex available from ICI.

The thickness of the substrate layer depends on numerous factors, including beam strength and economical considerations, and thus this layer for a flexible belt may be of substantial thickness, for example, about 125 micrometers, or of minimum thickness less than 50 micrometers, provided there are no adverse effects on the final electrostatographic device. In one flexible belt embodiment, the thickness of this layer ranges from about 65 micrometers to about 150 micrometers, and preferably from about 75 micrometers to about 100 micrometers for optimum flexibility and minimum stretch. The surface of the substrate layer is preferably cleaned prior to coating to promote greater adhesion of the deposited coating. Cleaning may be effected, for example, by exposing the surface of the substrate layer to plasma discharge, ion bombardment and the like.

The conductive layer may vary in thickness over substantially wide ranges depending on the optical transparency and degree of flexibility desired for the electrostatographic member. Accordingly, the thickness of the conductive layer may be between about 20 angstroms and about 750 angstrom, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. Typical vacuum depositing techniques include sputtering, magnetron sputtering, RF sputtering, and the like.

If desired, an alloy of suitable metals may be deposited. Typical metal alloys may contain two or more metals such as zirconium, niobium, tantalum, vanadium and hafnium, titanium, nickel, stainless steel, chromium, tungsten, molybdenum, and the like, and mixtures thereof. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 percent is desirable. The conductive layer need not be limited to metals. Other examples of conductive layers may be combinations of materials such as conductive Indium tin oxide or carbon black loaded polymer with low carbon black concentration as a transparent layer for light having a wavelength between about 4000 Angstroms and about 7000 Angstroms. A typical electrical conductivity for conductive layers for electrophotographic imaging members in slow speed copiers is about $10^2$ to $10^3$ ohms/square.

After formation of an electrically conductive surface, a hole blocking layer may be applied thereto. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be nitrogen containing siloxanes or nitrogen containing titanium compounds such as trimethoxysilyl propylene diamine, hydrolyzed trimethoxysilyl propyl ethylene diamine, N-beta-(aminoethyl) gamma-amino-propyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylaminoethylamino)titanate, isopropyl trianthranil titanate, isopropyl tri(N,N-dimethyl-ethylamino)titanate, titanium-4-amino benzene sulfonat oxyacetate, titanium 4-aminobenzoate isostearate oxyacetate, $[H_2N(CH_2)_4]CH_3Si(OCH_3)_2$, (gamma-aminobutyl) methyl diethoxysilane, and $[H_2N(CH_2)_3]CH_3Si(OCH_3)_2$ (gamma-aminopropyl) methyl diethoxysilane, as disclosed in U.S. Pat. Nos. 4,291,110, 4,338,387, 4,286,033 and 4,291,110. The disclosures of U.S. Pat. Nos. 4,338,387, 4,283,033 and 4,291,110 are incorporated herein in their entirety. A preferred blocking layer comprises a reaction product between a hydrolyzed silane and the oxidized surface of a metal ground plane layer. The oxidized surface inherently forms on the outer surface of most metal ground plane layers when exposed to air after deposition. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. The blocking layer should be continuous and have a thickness of less than about 0.2 micrometer because greater thicknesses may lead to undesirably high residual voltage.

An optional adhesive layer may applied to the hole blocking layer. Any suitable adhesive layer well known in the art may be utilized. Typical adhesive layer materials include, for example, polyesters, duPont 49,000 (available from E.I. duPont de Nemours and Company), Vitel PE-100 (available from Goodyear Tire & Rubber), polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the charge blocking layer including spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigment such as the X-form of metal free phthalocyanine described in U.S. Pat. No. 3,357,989, metal phthalocyanines such as vanadyl phthalocyanine and copper phthalocyanine, dibromoanthanthrone, squarylium, quinacridones available from DuPont under the tradename Monastral Red, Monastral violet and Monastral Red Y, Vat orange 1 and Vat orange 3 trade names for dibromo anthanthrone pigments, benzimidazole perylene, substituted 2,4-diamino-triazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layers comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infra-red light.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

Any suitable and conventional technique may be utilized to mix and thereafter apply the photogenerating layer coating mixture. Typical application techniques include spraying, dip coating, roll coating, wire wound rod coating, and the like. Drying of the deposited coating may be effected by any suitable conventional technique such as oven drying, infra red radiation drying, air drying and the like.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. A typical transport layer employed in one of the two electrically operative layers in multilayered photoconductors comprises from about 25 percent to about 75 percent by weight of at least one charge transporting aromatic amine compound, and about 75 percent to about 25 percent by weight of a polymeric film forming resin in which the aromatic amine is soluble. The charge transport layer forming mixture may, for example, comprise an aromatic amine compound of one or more compounds having the general formula:

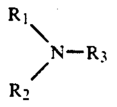

wherein $R_1$ and $R_2$ are an aromatic group selected from the group consisting of a substituted or unsubstituted phenyl group, naphthyl group, and polyphenyl group and $R_3$ is selected from the group consisting of a substituted or unsubstituted aryl group, alkyl group having from 1 to 18 carbon atoms and cycloaliphatic compounds having from 3 to 18 carbon atoms. The substituents should be free form electron withdrawing groups such as $NO_2$ groups, CN groups, and the like. Examples of charge transporting aromatic amines represented by the structural formulae above for charge transport layers capable of supporting the injection of photogenerated holes of a charge generating layer and transporting the holes through the charge transport layer include triphenylmethane, bis(4-diethylamine-2-methylphenyl)-phenylmethane; 4'-4"-bis(diethylamino)- 2',2"-dimethyltriphenylmethane, N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3"-methylphenyl)-(1,1'-biphenyl)-4,4'-diamine, and the like dispersed in an inactive resin binder.

Any suitable inactive resin binder soluble in methylene chloride or other suitable solvent may be employed in the photoreceptor. Typical inactive resin binders soluble in methylene chloride include polycarbonate resin, polyvinylcarbazole, polyester, polyarylate, polyacrylate, polyether, polysulfone, and the like. Molecular weights can vary, for example, from about 20,000 to about 150,000.

Any suitable and conventional technique may be utilized to mix and thereafter apply the charge transport layer coating mixture to the charge generating layer. Typical application techniques include spraying, dip coating, roll coating, wire wound rod coating, extrusion die coating and the like. Drying of the deposited coating may be effected by any suitable conventional technique such as oven drying, infra red radiation drying, air drying and the like.

Generally, the thickness of the hole transport layer is between about 10 to about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Examples of photosensitive members having at least two electrically operative layers include the charge generator layer and diamine containing transport layer members disclosed in U.S. Pat. Nos. 4,265,990, 4,233,384, 4,306,008, 4,299,897 and 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

Optionally, an overcoat layer may also be utilized to improve resistance to abrasion. In some cases an anti-curl back coating may be applied to the side opposite the photoreceptor to provide flatness and/or abrasion resistance. These overcoating and anti-curl back coating layers are well known in the art and may comprise thermoplastic organic polymers or inorganic polymers that are electrically insulating or slightly semi-conductive. Overcoatings are continuous and generally have a thickness of less than about 10 micrometers. The thickness of anti-curl backing layers should be sufficient to substantially balance the total forces of the layer or layers on the opposite side of the supporting substrate layer. The total forces are substantially balanced when the belt has no noticeable tendency to curl after all the layers are dried. An example of an anti-curl backing layer is described in U.S. Pat. No. 4,654,284 the entire disclosure of this patent being incorporated herein by reference. A thickness between about 70 and about 160 micrometers is a satisfactory range for flexible photoreceptors.

The assessment process of this invention is a rapid test that does not require extensive machine testing, nor extensive scanner testing, nor numerous reports from repairmen in the field. The simple, rapid test of this invention can, for example, be conducted in a brief ten cycle test. More specifically, the testing process of this invention is very rapid and can complete an assessment in as little as about 5 to 10 minutes compared to several days with scanners, 2-and 3 weeks with machine testing and several months with machines in the field. Moreover, the assessment preformed with the process of this invention is more accurate and free of dilution by unrelated effects due to machine interactions occurring in machine testing.

Since the coating composition for some of the photoconductive layers can significantly affect the ultimate electrical properties and photoreceptor life, it is common practice to test, only one belt from those made with a given batch of coating materials. One batch of coating material can produce many thousands of belts. Thus, a test of one belt represents the testing of many thousands of belts. With the process of the instant invention, samples made with a given batch can rapidly and inexpensively be tested to ensure greater quality control before too large of an inventory of unacceptable belts are produced. This also markedly reduces the amount of photoreceptor material that must be scrapped.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

A polyester film supplied from a roll was vacuum coated with an electrically conductive titanium layer having a thickness of about 200 Angstroms. The exposed surface of the titanium layer was oxidized by exposure to oxygen in the ambient atmosphere. A siloxane hole blocking layer was prepared by applying a 0.22 percent (0.001 mole) solution of 3-aminopropyl triethoxylsilane to the oxidized surface of the aluminum layer with a gravure applicator. The deposited coating was dried at 135° C. in a forced air oven to form a layer having a thickness of 450 Angstroms. A coating of polyester resin (49000, available from the E. I. du Pont de Nemours & Co.) was applied with a gravure applicator to the siloxane coated base. The polyester resin coating was dried to form a film having a thickness of about 0.05 micrometer. A slurry coating solution of 3 percent by weight sodium doped trigonal selenium having a particle size of about 0.05 micrometer to 0.2 micrometer and about 6.8 percent by weight polyvinylcarbazole and 2.3 percent by weight N,N'-diphenyl-N,N'-bis(3 methyl phenyl)-[1,1'-biphenyl]-4,4' diamine in a 1:1 by volume mixture of tetrahydrofuran and toluene was extrusion coated onto the polyester coating to form a layer having a wet thickness of 26 micrometers. The coated member was dried at 135° C. in a forced air oven to form a layer having a thickness of 2.5 micrometers. A charge transport layer were formed on the charge generator layers of the six different lots by applying a solution of Makrolon, a polycarbonate resin having a molecular weight from about 50,000 to about 100,000 available from Farbenfabriken Bayer A. G. and N,N'-diphenyl-N,N'-bis(3-methylphenyl)-[1,1'-biphenyl]-4,4'-diamine dissolved in methylene chloride to ultimately provide a 40 percent by weight loading of N,N'-diphenyl-N,N'-bis(3-methylphenyl)-[1,1'-biphenyl]-4,4'-diamine, respectively, in the dried transport layers of the six lots. The transport layers were coated on top of the generator layer and dried at temperature of about 135° C. to form 24 micrometer thick dry layer of hole transporting material. An anti curl backing coating was also applied. This photoreceptor, after cutting and welding into a belt, had a width of about 41 cm and an outside circumference of about 123 cm.

This control photoreceptor was machine tested in an electrophotographic duplicator having a pair of photoreceptor belt rollers each having a diameter of about 25 cm. Arranged around the periphery of the photoreceptor belt were conventional processing stations including a charging station, an image exposure station, a development station, a toner image transfer station and an erase station. The duplicator was operated to produce 90 copies per minute. It was found that this photoreceptor performed well to produce acceptable high quality copies for many hundreds of thousands of copies.

A rectangular 2 inches by 4 inches control test sample was prepared from an unused section of the same roll from which the foregoing control photoreceptor belt was prepared. The sample was treated along one edge with methylene chloride solvent to dissolve and remove parts of the charge transfer layer, charge generating layer and adhesive layer to expose part of the electrically conductive layer. A thick strip of electrically conductive silver paint was applied to the exposed surface of the electrically conductive layer for purpose of forming a terminal contact point for application of an electrical bias to the conductive layer. A circular area about 1 cm in diameter on the imaging surface of the photoreceptor not treated with solvent was coated with a thin, transparent vacuum deposited gold layer through a mask or stencil having a circular opening to form another electrode so that an electrical bias can be applied across the photoconductive layers of the photoreceptor from the gold electrode to the electrically conductive layer. This gold electrode had a thickness of about 200 angstroms. The rectangular test sample was tested in a device similar to that illustrated in FIGS. 1 and 2. With a cylindrical lid assembly in an open and load position, the free end of a pivotable electrical connector arm bearing an electrically conductive finger was pivoted upwardly away from an underlying flat glass on the upper surface of a base assembly. Next, a pivotable flat ground plate having a 4 cm in diameter round opening through its center was pivoted upwardly away from the flat glass upper surface. The pivotable flat ground plate was automatically disconnected from any source of electrical power and remained connected to ground whenever it was raised to either insert or remove a photoreceptor sample. The rectangular sample of flexible photoreceptor was placed on flat glass upper surface and the pivotable flat ground plate was lowered to flatten photoreceptor sample. The raised strip of thick conductive silver coating along one edge of the sample established electrical contact between the electrically conductive layer of the sample and the electrically conductive surface of the pivotable flat ground plate. The circular vacuum deposited metal electrode of gold was encircled by, but not in physical contact with the edge of the round opening in the pivotable flat ground plate. The lowering of the pivotable flat ground plate closed a safety switch and established an electrical connection between the electrically conductive finger and a electromagnetic relay (Model H-152, available from Kilovac) through a 2 megohm resistor. The cylindrical lid assembly was pivoted and lowered to produce a light tight fit between the lid assembly and the base assembly 36. Next, a voltage pulse from a Trek Model 6096-C power supply was applied by activation of the relay for 100 milliseconds, and the dark decay of the photoreceptor sample was measured with a contactless voltage probe (Model 17211, available from Trek) and electrometer (Model 366, available from Trek) during the dark cycle following the voltage pulse, but prior to light being emitted by the erase and exposure lights. The voltage pulse was at a fixed level-to give a field of 65 volts/micrometer from one cycle to another during the assessment period. The dark decay measurement was taken at a fixed time period of 1.8 second after termination of the voltage pulse and the measurement was recorded on chart recorder (Model TA2000, available from Gould). The photoreceptor sample was then exposed to an exposure light of about 5 $Ergs/cm^2$ projected downwardly through the circular vacuum deposited gold electrode on the photoreceptor sample. The entire sample was thereafter flood exposed by an Strobotac erase light source (Model GR1538-A, available from GenRad) of about 1000 $ergs/cm^2$ transmitted through the flat glass on the upper surface of a base assembly and through the back surface of the photoreceptor bearing the gold electrode. This cycle of charging, exposing and erasing was repeated for 16 cycles with the alternate cycles having no exposure for recording the dark decay, and the dark decay was plotted against the number of cycles and is shown in FIG. 4 as Curve A and represents a reference datum or control for purposes of rapidly identifying freshly fabricated substandard photoreceptors.

EXAMPLE II

The procedures for preparing a photoreceptor as described in Example I were repeated to form another test sample, except that the charge generator layer was made from a different coating batch which was prepared with the same formulation, but from a different batch of raw materials. This freshly prepared sample was tested in the same manner as that described in Example I. This photoreceptor sample performed poorly in a machine test identical to the machine test described in Example I. After producing less than about a third of the test copies successfully made during the test described in Example I, the machine began to show an undesirable level of charging current and the copies began to appear faint. This machine testing was conducted merely to verify that this rapid assessment technique embodiment of this invention was an effective assessment technique. When samples prepared from the same batch of this photoreceptor material was tested with the technique of this invention, as described in Example I, the dark decay plotted against the number of cycles formed the curve illustrated in FIG. 4 as Curve B. A comparison of Curves A and B demonstrates that poorly performing photoreceptors can rapidly be identified by the technique of this invention without machine testing.

EXAMPLE III

The procedures for preparing a photoreceptor as described in Example I were repeated to form another test sample from the batch described in Example I. Unlike the test procedure employed in Example I, where the voltage pulse from the power supply was at a fixed level to give a field of 65 volts/micron from one cycle to another during the assessment period, the voltage pulse from the power supply was gradually increased from a level which gave a field of 10 volts/micrometer to a level which gave a field of 65 volts/micrometer during the assessment period; recording at each level a sequence of pulses as was done in the Examples I and II. Each voltage pulse from a power supply Trek Model 6096-C was applied by activation of the relay (Model H-152 available from Kilovac) for 100 milliseconds, and the dark decay of the photoreceptor sample was measured with a contactless probe (Model 17211, available from Trek) and electrometer (Model 3666, available from Trek) during the dark cycle following the voltage pulse but prior to light being emitted by the erase and exposure lights. The dark decay measurement was taken at a fixed time period of 1.8 seconds after termination of the voltage pulse and the measurement was recorded on a chart recorder (Model TA2000, available from Gould). The photoreceptor sample was then exposed to an exposure light of about 5 ergs/cm$^2$ projected downwardly through the circular vacuum deposited gold electrode on the photoreceptor sample. The entire sample was thereafter flood exposed by an Strobotac erase light source (Model GR1538-A, available from GenRad) of about 1000 ergs/cm$^2$ transmitted through the flat glass on the upper surface of a base assembly and through the portion of the photoreceptor bearing the gold electrode. This cycle of charging, exposing and erasing was repeated for 4–6 cycles for every setting of voltage and the dark decay was plotted against the various voltage settings. This is shown in FIG. 5 as Curve C and represents a standard for purposes of rapidly identifying substandard freshly fabricated photoreceptors. One can compare the entire curve but since the curves fan out at higher voltages, better discrimination between acceptable photoreceptors and unacceptable photoreceptors is obtained at higher voltage levels. The use of a value other than the actual crest value but close to it, e.g. after every 4th cycle, might produce similar information. Thus, every 4th or 5th pulse may be sufficient. In the data illustrated in FIG. 5,4 cycles were used at each step. However, by the time higher voltages levels are reached, one does not need many cycles to attain a crest value. This is not the case if one applies high voltage levels from the very first cycle as was done in Examples I and II. In the latter embodiment, it takes more cycles, e.g. 10, to reach a crest value.

EXAMPLE IV

The procedures for preparing a photoreceptor as described in Example I were repeated to form another test sample, except that the charge generator layer was made using the same formulation but with materials from different batches of raw material. This freshly prepared sample was tested in the same manner as that described in Example III. This photoreceptor sample performed poorly in a machine test identical to the machine test described in Example III. After producing less than about a third of the test copies successfully made during the test described in Example I, the machine began to show an undesirable level of charging current and the copies began to appear faint. This machine testing was conducted merely to verify that the rapid assessment technique embodiment of this invention was an effective assessment technique. When samples from the same batch of this photoreceptor material was tested with the technique of this embodiment of this invention, as described in Example III, the dark decay plotted against the voltage settings formed the curve illustrated in FIG. 5 as Curve D. A comparison of Curves C and D demonstrates that poorly performing photoreceptors can rapidly and readily be identified by the technique of this invention without machine testing.

EXAMPLE V

Several batches of photoreceptors were analyzed using the technique of this invention as described in Examples I and II over a period of time. The stable dark decay, i.e. crest value, plotted against the life of the belt fabricated from the coating batches in terms of thousands of copies yielded an excellent correlation as shown in FIG. 6. The applied voltage in this Example was at a level sufficient to give a field of 65 volts/micrometer.

EXAMPLE VI

Figure 9:
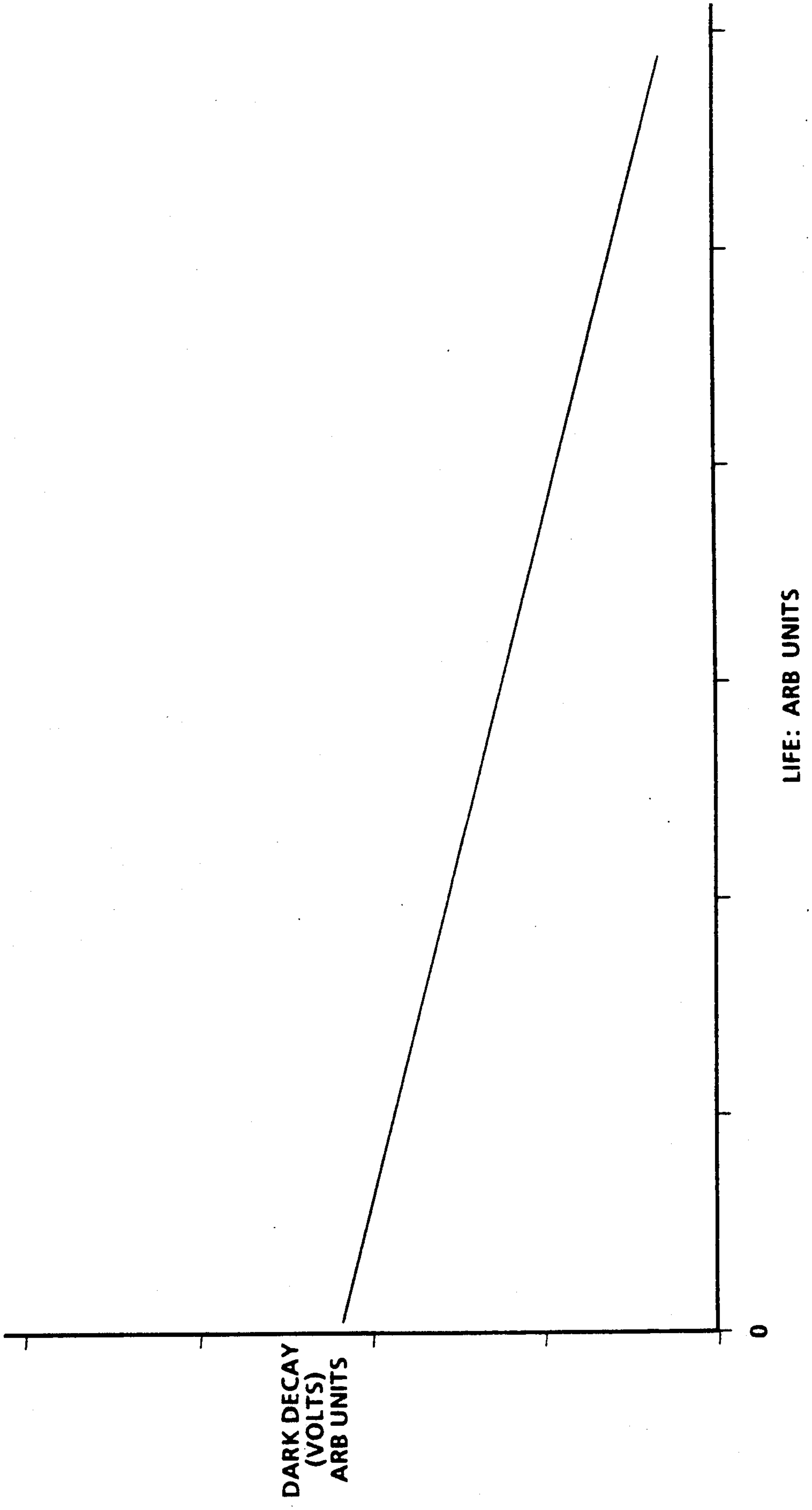
FIG. 9 is another chart illustrating a relationship between crest dark decay with cycles.

Several batches of photoreceptors were analyzed through the technique of this invention as described in Examples I and II over a period of time except that the applied voltage in this Example was at a level sufficient to give a field of 50 volts/micrometer instead of 65 volts/micrometer. The stable dark decay, i.e. crest value, plotted against the life of the belt fabricated from the coating batches in terms of thousands of copies yielded an excellent correlation as shown in FIG. 9.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process for ascertaining the projected imaging cycle life of an electrophotographic imaging member comprising the steps of (a) providing at least one electrophotographic imaging member having a cycling life of a known number of imaging cycles, said imaging member comprising an electrically conductive layer and at least one photoconductive layer, (b) repeatedly subjecting said at least one electrophotographic imaging member to cycles comprising electrostatic charging and light discharging steps, (c) measuring dark decay of said at least one photoconductive layer during cycling until the amount of dark decay reaches a crest value, (d) establishing with said crest value a reference datum for dark decay crest value versus imaging cycles, (e) repeatedly subjecting a virgin electrophotographic imaging member to aforesaid cycles comprising electrostatic charging and light discharging steps until the amount of dark decay reaches a crest value which remains substantially constant during further cycling; and (f) comparing said dark decay crest value of said virgin electrophotographic imaging member with said reference datum to ascertain the projected cycling life of said virgin electrophotographic imaging member.

2. A process for ascertaining the projected imaging cycle life of an electrophotographic imaging member according to claim 1 wherein said photoconductive layer is sandwiched between said electrically conductive layer and an electrode.

3. A process for ascertaining the projected imaging cycle life of an electrophotographic imaging member according to claim 1 including applying an electric potential to form an electric field across said photoconductive layer with a corotron.

4. A process for ascertaining the projected imaging cycle life of an electrophotographic imaging member according to claim 1 including applying an electric potential as a pulse having a duration of between about 10 milliseconds and about 1 second.

5. A process for ascertaining the projected imaging cycle life of an electrophotographic imaging member according to claim 1 wherein said at least one electrophotographic imaging member comprises an electrically conductive layer, a photoconductive charge generating layer and a charge transport layer.

6. A process for ascertaining the projected imaging cycle life of an electrophotographic imaging member according to claim 1 including selecting a threshold crest value and comparing the crest value of virgin electrophotographic imaging members with said threshold crest value to identify virgin electrophotographic imaging members that fail to meet said threshold crest value.

7. A process for ascertaining the projected imaging cycle life of an electrophotographic imaging member comprising the steps of (a) providing a first electrophotographic imaging member having a cycling life of a known number of imaging cycles, said imaging member comprising an electrically conductive layer and at least one photoconductive layer, (b) applying an electric potential to form an electric field across said at least one photoconductive layer, (c) terminating said applying of said electric potential, (d) exposing said at least one photoconductive layer to activating radiation to discharge said electrophotographic imaging member, (e) measuring the dark decay of said at least one photoconductive layer for the time period between about the time of termination of the applying of said potential and a predetermined time prior to or at the time of exposure of said at least one photoconductive layer to activating radiation, (f) recording the measured dark decay of said at least one photoconductive layer, (g) repeating said applying, terminating, exposing, measuring and recording steps until the amount of dark decay reaches a crest value which remains substantially constant during further repetition of said applying, terminating, exposing, measuring and recording steps, (h) repeating the aforesaid steps with at least a second electrophotographic imaging member having a different cycling life of a known number of imaging cycles to establish a reference datum for dark decay versus imaging cycles for said first electrophotographic imaging member and said second electrophotographic imaging member, (i) repeating, with a virgin electrophotographic imaging member, said applying, terminating, exposing, measuring and recording steps until the amount of dark decay reaches a crest value which remains substantially constant during further repetition of said applying, terminating, exposing, measuring and recording steps, and (j) comparing said dark decay crest value of said virgin electrophotographic imaging member with said reference datum to ascertain the projected cycling life of said virgin electrophotographic imaging member.

8. A process for ascertaining the projected imaging cycle life of an electrophotographic imaging member according to claim 7 including selecting said crest value when repeating of the applying, terminating, exposing, measuring and recording steps results in a change of dark decay of less than about 20 volts.

9. A process for ascertaining the projected imaging cycle life of an electrophotographic imaging member according to claim 7 including selecting said crest value when repeating of said applying, terminating, exposing, measuring and recording steps results in a change of dark decay of between about 0 and about 10 volts.

10. A process for ascertaining the projected imaging cycle life of an electrophotographic imaging member according to claim 7 including selecting said crest value when repeating of said applying, terminating, exposing, measuring and recording steps results in a change of dark decay of less than about 5 volts.

11. A process for ascertaining the projected imaging cycle life of an electrophotographic imaging member according to claim 7 wherein said electric potential applied to form an electric field across said at least one photoconductive layer is a fixed predetermined potential which remains the same each time said electric potential is applied.

12. A process for ascertaining the projected imaging cycle life of an electrophotographic imaging member according to claim 11 wherein an electric potential applied to form an electric field across the thickness of said at least one photoconductive layer is a fixed predetermined potential between about 45 volts per micrometer and about 80 volts per micrometer.

13. A process for ascertaining the projected imaging cycle life of an electrophotographic imaging member according to claim 11 including repeating said applying, terminating, exposing, measuring and recording steps for between about 4 and about 40 times until the amount of dark decay reaches said crest value.

14. A process for ascertaining the projected imaging cycle life of an electrophotographic imaging member according to claim 7 wherein an electric potential applied to form an electric field across said at least one photoconductive layer is progressively varied from a low value to a high value in successive repeating of the applying, terminating, exposing, measuring and recording step sequences.

15. A process for ascertaining the projected imaging cycle life of an electrophotographic imaging member according to claim 14 wherein an electric potential applied to form an electric field across the thickness of said at least one photoconductive layer is progressively varied within a range of from about 6 volts per micrometer to 80 volts per micrometer in successive applying, terminating, exposing, measuring and recording step sequences.

16. A process for ascertaining the projected imaging cycle life of an electrophotographic imaging member according to claim 14 wherein between about 4 and about 6 of said successive applying, terminating, exposing, measuring and recording step sequences are conducted at a fixed predetermined voltage setting.

17. A process for ascertaining the projected imaging cycle life of an electrophotographic imaging member comprising the steps of (a) providing a first electrophotographic imaging member having a known minimum number of acceptable imaging cycles, said first electrophotographic imaging member comprising an electrically conductive layer and at least one photoconductive layer, (b) supplying an electric potential to form an electric field across said at least one photoconductive layer, (c) terminating the supplying of said electric potential, (d) exposing said at least one photoconductive layer to activating radiation to discharge said electrophotographic imaging member, (e) measuring the dark decay of said at least one photoconductive layer for the time period between about the time of termination of the supplying of said electric potential and a predetermined time prior to or at the time of exposure of said at least one photoconductive layer to said activating radiation, (f) recording said dark decay of said at least one photoconductive layer, (g) repeating said supplying, terminating, exposing, measuring and recording steps until the amount of dark decay reaches a crest value which remains substantially constant during further repetition of said supplying, terminating, exposing, measuring and recording steps, (h) repeating, with a virgin electrophotographic imaging member having an unknown cycling life, said supplying, terminating, exposing, measuring and recording steps until the amount of dark decay reaches a crest value which remains substantially constant during further repetition of said supplying, terminating, exposing, measuring and recording steps, (i) comparing the dark decay crest value of said virgin electrophotographic imaging member with the dark decay crest value of said first electrophotographic imaging member, and (j) discarding virgin photoreceptor samples that have a dark decay crest value exceeding the dark decay crest value of said first electrophotographic imaging member.

* * * * *